US008189926B2

(12) United States Patent
Sharma et al.

(10) Patent No.: US 8,189,926 B2
(45) Date of Patent: May 29, 2012

(54) METHOD AND SYSTEM FOR AUTOMATICALLY ANALYZING CATEGORIES IN A PHYSICAL SPACE BASED ON THE VISUAL CHARACTERIZATION OF PEOPLE

(75) Inventors: Rajeev Sharma, State College, PA (US); Satish Mummareddy, Washington, DC (US); Priya Baboo, State College, PA (US); Jeff Hershey, Norfolk, VA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1179 days.

(21) Appl. No.: 11/999,656

(22) Filed: Dec. 6, 2007

(65) Prior Publication Data

US 2008/0159634 A1   Jul. 3, 2008

Related U.S. Application Data

(60) Provisional application No. 60/877,953, filed on Dec. 30, 2006.

(51) Int. Cl.
*G06K 9/62* (2006.01)

(52) U.S. Cl. .......................... 382/224; 382/103; 382/181

(58) Field of Classification Search .................. 382/100, 382/103, 224, 231, 106, 107, 115, 153, 161, 382/181, 223; 707/722, 735
See application file for complete search history.

(56) References Cited

U.S. PATENT DOCUMENTS

| | | | |
|---|---|---|---|
| 6,741,973 | B1 | 5/2004 | Dove et al. |
| 7,006,982 | B2 | 2/2006 | Sorensen |
| 2002/0085092 | A1 | 7/2002 | Choi et al. |
| 2003/0002712 | A1 | 1/2003 | Steenburgh et al. |
| 2003/0053659 | A1 | 3/2003 | Pavlidis et al. |
| 2003/0058339 | A1 | 3/2003 | Trajkovic et al. |
| 2004/0113933 | A1 | 6/2004 | Guler |
| 2004/0120581 | A1 | 6/2004 | Ozer et al. |
| 2004/0131254 | A1 | 7/2004 | Liang et al. |
| 2005/0286774 | A1 | 12/2005 | Porikli |
| 2006/0010028 | A1 | 1/2006 | Sorensen |
| 2006/0053342 | A1 | 3/2006 | Bazakos et al. |
| 2008/0031491 | A1* | 2/2008 | Ma et al. ...................... 382/103 |

OTHER PUBLICATIONS

AdvancedInterfaces.com Web Pages, 2003-2005, AdvancedInterfaces, Inc., Retrieved from web.archive.org on Oct. 20, 2011.*
U.S. Appl. No. 10/403,234, Sharma, et al.
U.S. Appl. No. 60/833,031, Sharma, et al.
U.S. Appl. No. 60/808,283, Sharma, et al.

* cited by examiner

*Primary Examiner* — Brian Q Le
*Assistant Examiner* — Edward Park

(57) ABSTRACT

The present invention is a method and system for automatically analyzing a category in a plurality of the categories in a physical space based on the visual characterization, such as behavior analysis or segmentation, of the persons with regard to the category. The present invention captures a plurality of input images of the persons in the category by a plurality of means for capturing images. The present invention processes the plurality of input images in order to understand the shopping behavior of the persons with the sub-categories of the category and analyzes the level of engagement and decision process at the sub-category level. The processes are based on a novel usage of a plurality of computer vision technologies to analyze the visual characterization of the persons from the plurality of input images. The physical space may be a retail space, and the persons may be customers in the retail space.

48 Claims, 20 Drawing Sheets

| INTERACTION DESCRIPTION | SHOPPING INTERACTION LEVELS |
|---|---|
| PASSING BY NO CHANGE IN VELOCITY | LEVEL 1 |
| NOTICING SLOWING DOWN + REGAIN VELOCITY | LEVEL 2 |
| STOPPING | LEVEL 3 |
| ENGAGING 1 STOPPING FOR $T_i > T_1$ SECONDS | LEVEL 4 |
| ... | ... |
| ENGAGING P-1 STOPPING FOR $T_i > T_{p-1}$ SECONDS | LEVEL P-1 |
| PURCHASE | LEVEL P |

Fig. 4

| CAT. | BEHAVIOR MEASUREMENT DURING WINDOW OF TIME W1 (T1~Tn) | | | | | |
|---|---|---|---|---|---|---|
| CUST. 1 | (C1,PB, P1) | (C2,PB, P2) | (C3,L2, P3) | ... | (C4,PB, P4) | |
| CUST. 2 | (C1,PB, P1) | (C3,L2, P3) | (C2,PB, P2) | ... | (C4,PB, P4) | (C5,L3, P5) |
| ⋮ | | | ... | | | |
| CUST. I-1 | | (C1,PB, P1) | (C4,L2, P4) | ... | (C3,PB, P3) | (C3,PB, P3) |
| CUST. I | (C4,PB, P4) | (C3,L3, P3) | (C2,L2, P2) | (C1,PB, P1) | | |

⋮

| CAT. | BEHAVIOR MEASUREMENT DURING WINDOW OF TIME Wp (T1~Tn) | | | | | |
|---|---|---|---|---|---|---|
| CUST. 1 | (C2,PB, P2) | (C3,PB, P3) | (C1,L2, P1) | ... | (C1,PB, P1) | |
| ⋮ | | | ... | | | |
| CUST. J-1 | | (C1,PB, P1) | (C3,L2, P3) | ... | (C4,L2, P4) | (C5,PB, P5) |
| CUST. J | (C2,PB, P2) | (C1,PB, P1) | (C3,L2, P3) | ... | (C4,PB, P4) | |
| ⋮ | | | ... | | | |
| CUST. K | | (C3,L3, P3) | (C2,PB, P2) | ... | (C1,PB, P1) | (C3,PB, P3) |

Fig. 5

| SUB-CATEGORY 1 | TIME | | | | | | 610 |
|---|---|---|---|---|---|---|---|
| | T1 | T2 | T3 | | Tn-1 | Tn | |
| BHEAVIOR CLASS — CLASS 1 | 45% | 47% | 50% | ... | 52% | 56% | |
| BHEAVIOR CLASS — CLASS 2 | 35% | 28% | 34% | ... | 40% | 42% | |
| BHEAVIOR CLASS — CLASS 3 | 20% | 25% | 16% | ... | 8% | 2% | |

UNIT: %

⋮

| SUB-CATEGORY N | TIME | | | | | | 611 |
|---|---|---|---|---|---|---|---|
| | T1 | T2 | T3 | | Tn-1 | Tn | |
| BEHAVIOR CLASS — CLASS 1 | 30% | 32% | 35% | ... | 33% | 30% | |
| BEHAVIOR CLASS — CLASS 2 | 20% | 28% | 34% | ... | 26% | 22% | |
| BEHAVIOR CLASS — CLASS 3 | 50% | 40% | 31% | ... | 41% | 48% | |

UNIT: %

Fig. 6

METHOD AND SYSTEM FOR AUTOMATICALLY ANALYZING CATEGORIES IN A PHYSICAL SPACE BASED ON THE VISUAL CHARACTERIZATION OF PEOPLE

CROSS-REFERENCE TO RELATED APPLICATIONS

This application claims the benefit of U.S. Provisional Patent Application No. 60/877,953, filed Dec. 30, 2006.

FEDERALLY SPONSORED RESEARCH

Not Applicable

SEQUENCE LISTING OR PROGRAM

Not Applicable

BACKGROUND OF THE INVENTION

1. Field of the Invention

The present invention is a method and system for automatically analyzing a category in a plurality of the categories in a physical space based on the visual characterization, such as behavior analysis or segmentation, of the persons with regard to the category, wherein the present invention captures a plurality of input images of the persons in the category by a plurality of means for capturing images and processes the plurality of input images in order to understand the shopping behavior of the persons with the sub-categories in the category and analyze the level of engagement and decision process at the sub-category level.

2. Background of the Invention

Shoppers' Behavior Analysis:

There have been earlier attempts for understanding customers' shopping behaviors captured in a video in a targeted environment, such as in a retail store, using cameras.

U.S. Pat. Appl. Pub. No. 2006/0010028 of Sorensen (hereinafter Sorensen 1) disclosed a method for tracking shopper movements and behavior in a shopping environment using a video. In Sorensen 1, a user indicated a series of screen locations in a display at which the shopper appeared in the video, and the series of screen locations were translated to store map coordinates. The step of receiving the user input via input devices, such as a pointing device or keyboard, makes Sorensen 1 inefficient for handling a large amount of video data in a large shopping environment with a relatively complicated store layout, especially over a long period of time. The manual input by a human operator/user cannot efficiently track all of the shoppers in such cases, not to mention the possibility of human errors due to tiredness and boredom. The manual input approach is also much less scalable as the number of shopping environments to handle for the behavior analysis increases.

Although U.S. Pat. Appl. Pub. No. 2002/0178085 of Sorensen, now U.S. Pat. No. 7,006,982, (hereinafter Sorensen 2) disclosed a usage of tracking device and store sensors in a plurality of tracking systems primarily based on the wireless technology, such as the RFID, Sorensen 2 is clearly foreign to the concept of applying computer vision based tracking algorithms to the field of understanding customers' shopping behaviors and movements. In Sorensen 2, each transmitter was typically attached to a hand-held or push-type cart. Therefore, Sorensen 2 cannot distinguish the behaviors of multiple shoppers using one cart from the behavior of a single shopper also using one cart. Although Sorensen 2 disclosed that the transmitter may be attached directly to a shopper via a clip or other form of customer surrogate in order to correctly track the shopper in the case when the person is shopping without a cart, this will not be practical due to the additionally introduced cumbersome step to the shopper, not to mention the inefficiency of managing the transmitter for each individual shopper.

Sorensen 2 cannot efficiently provide the exact path of a shopper since it is based on creating a computer-simulated field of view for each shopper based on the direction of travel. Also, the shopping behavior cannot be deciphered accurately as it is again based on determining the products that lie within the simulated field of view of the shoppers, and could result in incorrect judgments. On the contrary, the proprietary computer vision based technology in the present invention automatically tracks shoppers and their behaviors at the category level in the retail space without using any simulation or approximation techniques, thus providing efficient shopper behavior information.

U.S. Pat. No. 6,741,973 of Dove et al. (hereinafter Dove) disclosed a model of generating customer behavior in a transaction environment. Although Dove disclosed video cameras in a real bank branch as a way to observe the human behavior, Dove is clearly foreign to the concept of automatic and real-time analysis of the customers' behaviors, based on visual information of the customers in a retail environment, such as the shopping path tracking and analysis.

With regard to the temporal behavior of customers, U.S. Pat. Appl. Pub. No. 2003/0002712 of Steenburgh, et al. (hereinafter Steenburgh) disclosed a relevant prior art. Steenburgh disclosed a method for measuring dwell time of an object, particularly a customer in a retail store, which enters and exits an environment, by tracking the object and matching the entry signature of the object to the exit signature of the object, in order to find out how long people spend in retail stores.

U.S. Pat. Appl. Pub. No. 2003/0053659 of Pavlidis, et al. (hereinafter Pavlidis) disclosed a method for moving object assessment, including an object path of one or more moving objects in a search area, using a plurality of imaging devices and segmentation by background subtraction. In Pavlidis, the object included customers. Pavlidis was primarily related to monitoring a search area for surveillance, but Pavlidis also included itinerary statistics of customers in a department store.

U.S. Pat. Appl. Pub. No. 2004/0120581 of Ozer, et al. (hereinafter Ozer) disclosed a method for identifying activity of customers for marketing purpose or activity of objects in a surveillance area, by comparing the detected objects with the graphs from a database. Ozer tracked the movement of different object parts and combined them to high-level activity semantics, using several Hidden Markov Models (HMMs) and a distance classifier.

U.S. Pat. Appl. Pub. No. 2004/0131254 of Liang, et al. (hereinafter Liang) also disclosed the Hidden Markov Models (HMMs) as a way, along with the rule-based label analysis and the token parsing procedure, to characterize behavior in their disclosure. Liang disclosed a method for monitoring and classifying actions of various objects in a video, using background subtraction for object detection and tracking. Liang is particularly related to animal behavior in a lab for testing drugs.

There have been earlier attempts for activity analysis in various other areas than understanding customers' shopping behaviors, such as the surveillance and security applications.

Object Activity Modeling and Analysis:

The following prior arts are not restricted to the application area for understanding customers' shopping behaviors in a targeted environment, but they disclosed methods for object activity modeling and analysis for human body, using a video, in general.

U.S. Pat. Appl. Pub. No. 2002/0085092 of Choi, et al. (hereinafter Choi) disclosed a method for modeling an activity of a human body using optical flow vector from a video and probability distribution of the feature vectors from the optical flow vector. Choi modeled a plurality of states using the probability distribution of the feature vectors and expressed the activity based on the state transition.

U.S. Pat. Appl. Pub. No. 2004/0113933 of Guler disclosed a method for automatic detection of split and merge events from video streams in a surveillance environment. Guler considered split and merge behaviors as key common simple behavior components in order to analyze high level activities of interest in a surveillance application: which are also used to understand the relationships among multiple objects not just individual behavior. Guler used adaptive background subtraction to detect the objects in a video scene and the objects were tracked to identify the split and merge behaviors. To understand the split and merge behavior-based high level events, Guler used a Hidden Markov Model (HMM).

Event Detection based on Shoppers' Behavior Analysis:

There have been earlier attempts for event detection based on customers' behaviors in a video.

U.S. Pat. Appl. Pub. No. 2003/0058339 of Trajkovic, et al. (hereinafter Trajkovic) disclosed a method for detecting an event through repetitive patterns of human behavior. Trajkovic learned multi-dimensional feature data from the repetitive patterns of human behavior and computed a probability density function (PDF) from the data. Then, a method for the PDF analysis, such as Gaussian or clustering techniques, was used to identify the repetitive patterns of behavior and unusual behavior through the variance of the Gaussian distribution or cluster.

Although Trajkovic can model a repetitive behavior through the PDF analysis, Trajkovic is clearly foreign to the event detection for the aggregate of non-repetitive behaviors, such as the shopper traffic in a category of a physical space. The shopping path of an individual shopper can be repetitive, but each shopping path in a group of aggregated shopping paths of multiple shoppers is not repetitive. Trajkovic did not disclose the challenges in the event detection based on customers' behaviors in a video in a retail environment such as this, and Trajkovic is clearly foreign to the challenges that can be found in a retail environment.

U.S. Pat. Appl. Pub. No. 2006/0053342 of Bazakos, et al. (hereinafter Bazakos) disclosed a method for unsupervised learning of events in a video. Bazakos disclosed a method of creating a feature vector of a related object in a video by grouping clusters of points together within a feature space and storing the feature vector in an event library. Then, the behavioral analysis engine in Bazakos determined whether an event had occurred by comparing features contained within a feature vector in a specific instance against the feature vectors in the event library. Bazakos is primarily related to surveillance rather than event detection based on customers' behaviors in a video.

U.S. Pat. Appl. Pub. No. 2005/0286774 of Porikli disclosed a method for event detection in a video using approximate estimates of the aggregated affinity matrix and clustering and scoring of the matrix. Porikli constructed the affinity matrix based on a set of frame-based and object-based statistical features, such as trajectories, histograms, and Hidden Markov Models of feature speed, orientation, location, size, and aspect ratio, extracted from the video.

The prior arts above are foreign to the concept of understanding customers' shopping behaviors, by tracking and analyzing the movement information of the customers, in regards to sub-categories of a "category" in a physical space, such as a retail store. Category is defined as a logical entity for a group of products, a group of product types, space, areas in a store, display of a group of products, or department with similar relevance in the present invention. The present invention discloses a novel usage of computer vision technologies for more efficiently understanding the shoppers' behaviors in a category of a physical space, such as a retail space, by tracking and analyzing the movement information of the customers in regards to the sub-categories of the category. The present invention also discloses a novel approach of analyzing the category based on the automated measurement of the shoppers' behaviors in regards to the sub-categories.

SUMMARY

The present invention is a method and system for automatically analyzing a category in a plurality of the categories in a physical space based on the visual characterization of the persons with regard to the category. The visual characterization of the persons can comprise behavior analysis or segmentation, such as demographics, of the persons.

It is an objective of the present invention to automatically analyze a category in a physical space based on video-based behavior analysis of a plurality of persons with regard to the category in the physical space in a preferred embodiment of the present invention.

The present invention captures a plurality of input images of the persons in the category by a plurality of means for capturing images. The present invention processes the plurality of input images in order to understand the shopping behaviors of the persons in regards to the sub-categories of the category and analyzes the level of engagement and decision process at the sub-category level.

The processes are based on a novel usage of a plurality of computer vision technologies to analyze the visual characterization of the persons from the plurality of input images. The present invention processes the plurality of input images in order to track the person in each field of view of the plurality of means for capturing images.

The present invention efficiently handles the joining of the plurality of tracks across the multiple fields of view of the plurality of means for capturing images, accounting for splits and merges, and finds the information for the trip of the person based on the processed results from the plurality of tracks. In the embodiment of the present invention, the trip information can comprise coordinates of the person's position and temporal attributes, such as trip time and trip length, for the plurality of trips.

It is another objective of the present invention to utilize a plurality of second means for capturing images to track the hand of each person in the plurality of persons in the category and to provide sub-category level information for shopping interaction of the plurality of persons in the category.

The physical space may be a retail space, and the persons may be customers in the retail space in the description of the invention. However, although the disclosed method may be described in the context of a retail space, the present invention can be applied to any physical space that has a restricted boundary, and the application area of the present invention is not limited to the retail space.

In an exemplary application, the present invention can be applied to the customers or shoppers in a retail space. The behavior based category analysis in the present invention is a comprehensive solution that can provide insight into shopper behaviors relative to a particular category in a physical space, such as a retail store. This solution provides information on actual shopper behavior for a very large number of shoppers, and delivers a wealth of information not available through other traditional research methods. It enables consumer product manufacturers and retailers to better perform category management activities and execute category specific initiatives.

Thus, it is another objective of the present invention to provide an automated category analysis, which provides deeper insights into shopper behaviors relative to a particular category, especially for a large number of shoppers, in a scalable manner.

The solution leverages the strengths of the technologies in the present invention and processes to deliver a new level of access to the behaviors and characteristics of shoppers and of the purchase decision process. The solution utilizes automated methods of extracting information about category level shopper behavior in order to measure and optimize category performance.

The present invention provides an unprecedented opportunity for manufacturers and retailers to analyze and optimize the performance of a category using automated tools for behavior and segmentation analysis. Most manufacturers can tell how their category is performing based on point-of-sale data, but they do not have a clear understanding of how shoppers behave in front of the category.

The solution in the present invention is based on proprietary technology that automatically measures shopper behavior in front of a category, and helps to understand the influence of causal factors, like assortment, promotions, displays and local competition, on shoppers' purchase decisions. It provides an in-depth understanding of who the category shoppers are, what they are buying or not buying, and how they are buying. Such in-depth understanding of shopper behavior will uncover hidden opportunities to grow the category.

It is a further objective of the present invention to analyze the category in regards to the segmentation of the plurality of persons. Examples of the segmentation can comprise demographic classification or shopping patterns of the plurality of persons.

The present invention will provide demographic segmentation of the category shoppers by gender and age group. The shopping behavior of each demographic group will be analyzed to obtain segment-specific insights. Understanding segment-based shopper behavior for a specific category can help to develop effective customer-centric strategies to increase the basket size and loyalty of highest-opportunity segments.

The automated solution provides customers with fact-based insights to improve the overall performance of the category. The following provides a sample of the analysis types that the present invention employs to derive category-level behavior insights.

Category Traffic Flow Analysis

This analysis provides a complete picture of shopper traffic patterns in a particular category. Insights from this analysis will enable retailers to take a fresh look at the amount of space devoted to categories and the location of these categories within stores. With a clear understanding of the traffic patterns for a given category, retailers can identify locations where shoppers will be more receptive to marketing initiatives.

Category Shopping Behavior Analysis

This analysis provides an in-depth understanding of how consumers actually shop the product category. Such fact-based insights will empower retailers with information about the ideal product assortment to have on the shelf for a given category while minimizing shelf space and the number of products stocked. This would create a convenient shopping experience for the category that effectively matches the needs of the shoppers.

It is another objective of the present invention to analyze shopping interaction by the plurality of persons in regards to shelves, which are located in the category. The shelves can provide another dimension of measurement for the shopping interaction analysis in the category. Each interaction of a plurality of interactions in the shelves may have unique meaning because the intent of one interaction can be different from the intent of another interaction in the plurality of interactions.

Analysis of shopping interaction in regards to shelves can comprise the following:
- analysis of the shopping pattern when a shelf space in the shelves is empty,
- calculation of the frequency of replenishing a certain product in the shelves for an efficient inventory management of the product,
- calculation of optimal size and height of the shelves based on shopping interaction analysis in regards to the shelves for easy access by customers, and
- calculation of optimal layout for the shelves, such as the optimal position of a product, the optimal number of products, the efficient product assortment, and the optimal type of products in the shelves.

Shopper Segmentation Analysis

Shopper segmentation analysis will offer insights about who the shoppers are for a particular category. A clear understanding of shopper segments and their purchase behavior for a category will enable manufacturers and retailers to develop successful customer-centric strategies that improve basket size and loyalty.

Benefits of Behavior Based Category Analysis

The automated behavior analysis technology in the present invention can help manufacturers and retailers to:
- improve category performance based on a deep understanding of category level behaviors,
- design effective retail programs by understanding market level shopper profiles and preferences,
- develop micro-marketing strategies that appeal to local demographic groups resulting in increased loyalty to the store and brand,
- implement efficient product assortment strategies that are complete, profitable and satisfy the customer needs, and
- enable efficient use of space in the store resulting in an improved shopping environment, higher profits, and less frequent out-of-stocks.

It is another objective of the present invention to measure and provide domain specific information in the category based on the category analysis. Examples of the domain specific information can comprise the following:
- sequence of products shopped in the category,
- ranking of products shopped in the category,
- product purchase pattern, and
- comparison of products that are interacted by the plurality of persons within the category.

It is a further objective of the present invention to extract analytic and statistical data from the category analysis. Examples of the analytic and statistical data can comprise the following:

- quantitative measurement per sub-category, such as a ratio between shopping interaction levels, level 2 over level 1 for a sub-category, based on actual measurement for the shopping interaction levels of the plurality of persons,
- maps: visualization of the quantitative measurement, whereby the map can use color-coded symbolic expression to differentiate the sub-category level shopping conversion among a plurality of persons at the category.
- dominant path measurement, which implies a specific decision pattern, because a finite number of next regions to choose from a "location A" defines the number of directions from that specific location and shows the tendency/preference of customers' decisions for the next path,
- sub-category sequence, which includes the order of engagement, and
- sub-category correlation of shopping paths for optimal distance among a plurality of sub-categories shopped, whereby the sub-category correlation can be represented in a multi-dimensional adjacency table or map.

DRAWINGS

Figures

FIG. 4 shows an exemplary shopping interaction levels that can be used as a criteria for the behavioral analysis of a plurality of persons in a category using the computer vision based tracking.

FIG. 5 shows an exemplary behavior measurement for an exemplary category based on the customers' interactions with sub-categories in the category for a plurality of different windows of time through a plurality of exemplary tables for behavior measurement.

FIG. 6 shows exemplary statistics of the behavioral information for each sub-category in a category based on the behavior measurement.

DETAILED DESCRIPTION OF THE INVENTION

Figure 1:
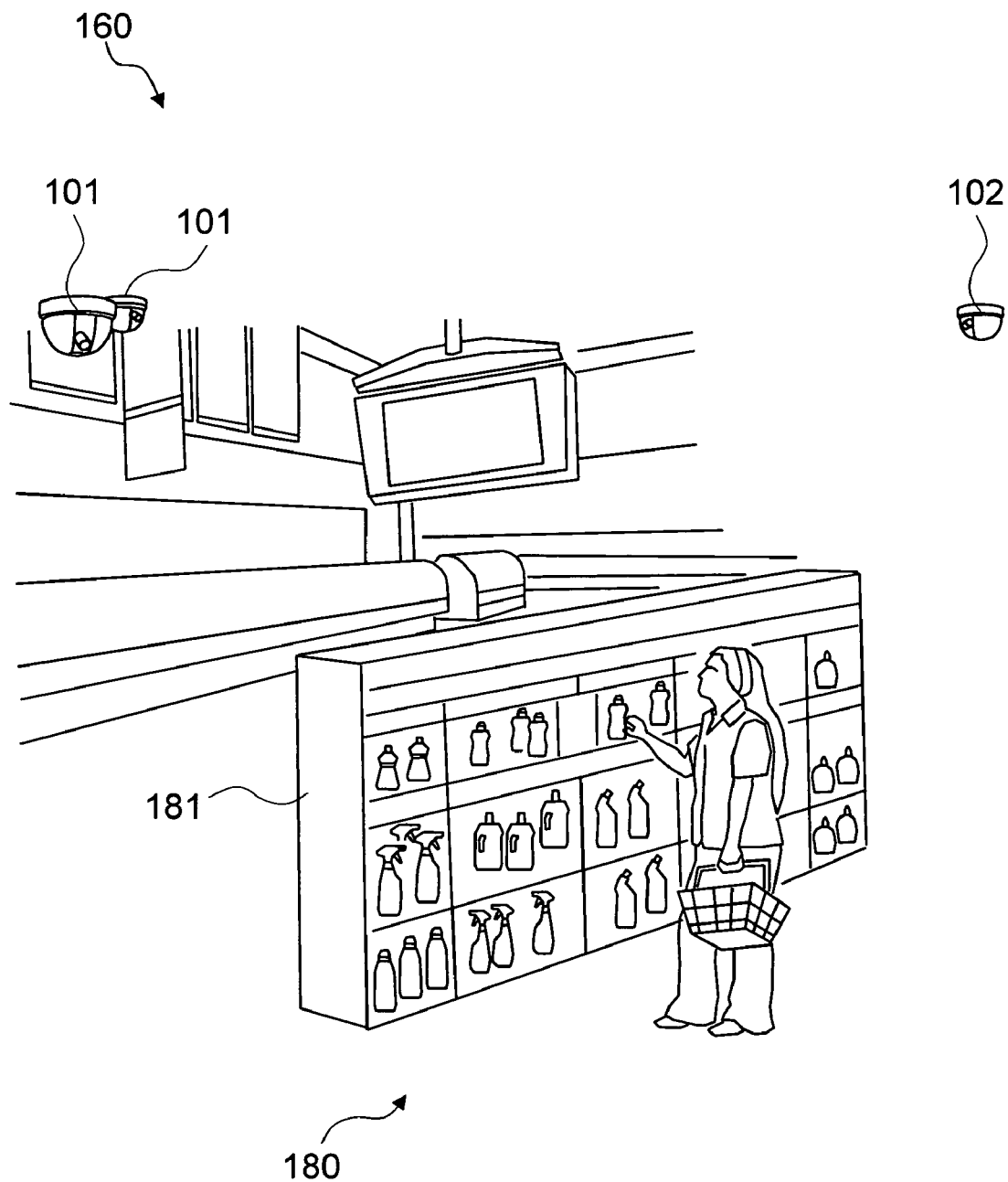
FIG. 1 is an overall view of an exemplary embodiment of the invention, where the present invention measures and analyzes the interaction of a plurality of persons with sub-categories of a category in a physical space, using a plurality of first means for capturing images and a plurality of second means for capturing images.

FIG. 1 is an overall view of an exemplary embodiment of the invention, where the present invention measures and analyzes the interaction of a plurality of persons with sub-categories of a category 160 in a physical space, using a plurality of first means for capturing images 101 and a plurality of second means for capturing images 102.

The physical space may be a retail space, and the persons may be customers in the retail space in the description of the invention. However, although the disclosed method may be described in the context of a retail space, the present invention can be applied to any physical space that has a restricted boundary, and the application area of the present invention is not limited to the retail space.

The term "category" is defined as a logical entity for a group of products, a group of product types, space, areas in a store, display of a group of products, or department with similar relevance in the present invention. The term "sub-category" is also similarly defined as a logical entity for a group of products, a group of product types, space, areas in a store, display of a group of products, or department with similar relevance, in regards to the "category" in the present invention. The "category" can comprise a plurality of "sub-categories". The type or characteristics of the "sub-category" does not have to match with that of "category", but the "sub-category" is defined in connection with the "category" in the present invention. A category is not necessarily a spatially adjacent single entity, which means a category can consist of multiple distributed physical spaces or detached components.

In an exemplary embodiment, the present invention may use a plurality of first means for capturing images 101 for applying any of the known reliable person tracking computer vision algorithms to track and detect the customers' presence in the vicinity of a plurality of sub-categories in a category 160. Then, the present invention may use a plurality of second means for capturing images 102 for applying a hand tracking algorithm or motion detection algorithm in the computer vision technologies to detect the customers' shopping interaction with the product groups in association with the sub-categories in a category 160. In this exemplary embodiment, the sub-categories may be defined at the product group level on shelves, where the shelves are essentially a category.

The exemplary embodiment shown in FIG. 1 comprises an aisle 180 in regards to a category and product groups on shelves 181 in regards to sub-categories of the category. In the present invention, "shelf" and "shelves" are used interchangeably. Both of them are used to refer to "shelves" in an aisle in a retail space. In the present invention, "shelf-set" means products in a particular shelf or in multiple shelves in an aisle.

In an exemplary application, the present invention can be applied to the customers or shoppers in a retail space. The behavior based category analysis in the present invention is a comprehensive solution that can provide insight into shopper behaviors relative to a particular category in a physical space, such as a retail store. This solution provides information on actual shopper behavior for a very large number of shoppers, and delivers a wealth of information not available through other traditional research methods. It enables consumer product manufacturers and retailers to better perform category management activities and execute category specific initiatives.

The solution leverages the strengths of the technologies in the present invention and processes to deliver a new level of access to the behaviors and characteristics of shoppers and of the purchase decision process. The solution utilizes automated methods of extracting information about category level shopper behavior in order to measure and optimize category performance. Analysis of this behavior information can be used for the following:

Gauging overall category performance
  Gauging relative category performance—Versus similar, complementary or adjacent categories
  Gauging aisle performance, where an aisle consists of a group of categories
  Gauging the impact of category resets on shopper behavior
  Specific areas of analysis include but are not limited to:
  Aisle Traffic Flow Analysis—Provides an understanding of the overall aisle dynamics as they relate to a specific category or categories
  Aisle Shopping Analysis—Further segments overall aisle traffic into those that shopped one or more categories in the aisle
  Category Flow Analysis—Provides the characteristics of shopper traffic in the context of a specific category
  Category Shopping Analysis—Provides further insights into how a specific category is shopped by providing detail into the shopping behaviors for a category's subsections
  Category Destination and Cross Category Analysis—Provides insight into the frequency with which category subsections are shopped first as well as how often a category is shopped in conjunction with other categories Shopper characteristics such as demographic information (gender, age range, and ethnicity) can be measured as well to provide even greater value by enabling the identification of specific behavior patterns for specific demographic segments.

Figure 2:
FIG. 2 is a close-up view of an exemplary embodiment of the invention, where it shows an exemplary location of a second means for capturing images with regard to a shelf in a category.

FIG. 2 is a close-up view of an exemplary embodiment of the invention, where it shows an exemplary location of a second means for capturing images 102 with regard to a shelf 181 in a category 160. In the vicinity of the shelf 181 in the exemplary category 160 shown in FIG. 2, a customer interacts with products in the shelf 181. In this exemplary embodiment, a second means for capturing images 102 is installed in a location above the customer's interaction space and from which the second means for capturing images 102 can see the customer's interaction with the product groups in the shelf 181 in an optimal condition.

Figure 3:
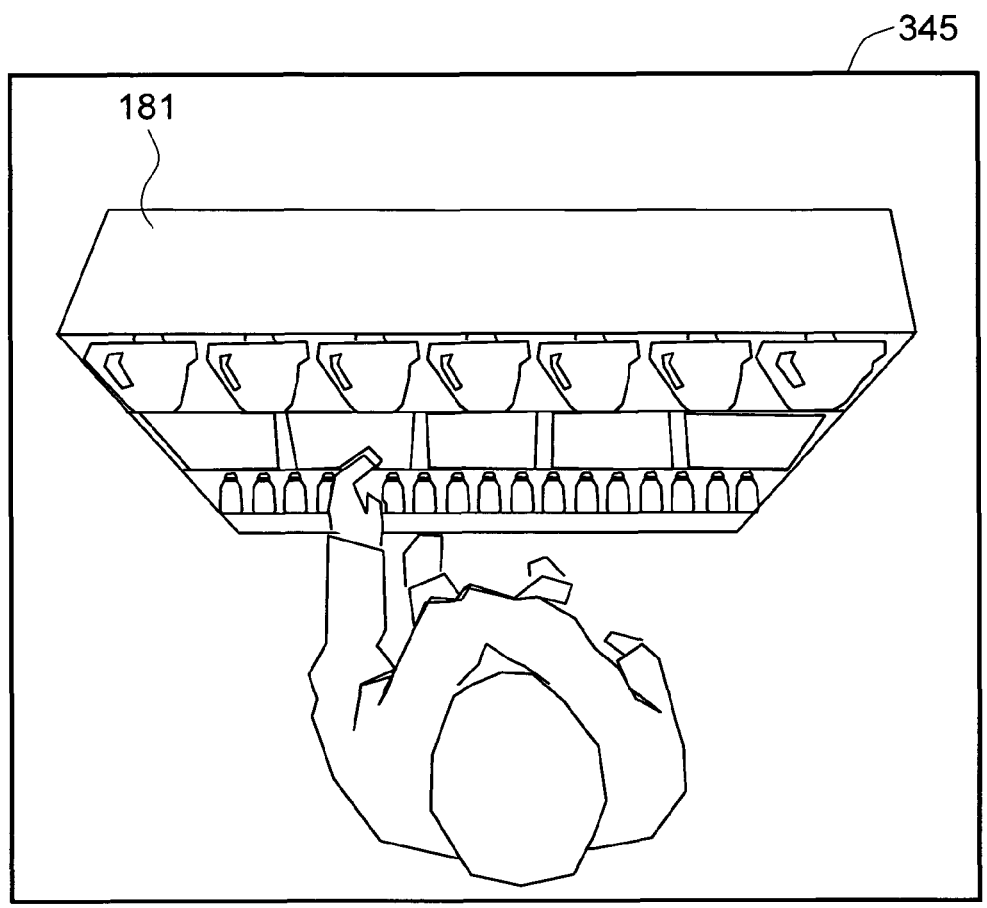
FIG. 3 is an exemplary field of view from a second means for capturing images, which is installed with regard to a shelf in a category, in an exemplary embodiment of the invention.

FIG. 3 is an exemplary field of view 345 from a second means for capturing images 102, which is installed with regard to a shelf 181 in a category 160, in an exemplary embodiment of the invention. The exemplary field of view 345 can be a particular field of view from the second means for capturing images 102 shown in FIG. 2.

Utilizing a plurality of first means for capturing images 101 and a plurality of second means for capturing images 102 as shown in FIG. 1 through FIG. 3, along with a plurality of computer vision technologies, such as person tracking, hand motion detection, and demographic classification at the category level, the present invention provides an unprecedented opportunity for manufacturers and retailers to analyze and optimize the performance of a category using automated tools for behavior and segmentation analysis. Most manufacturers can tell how their category is performing based on point-of-sale data, but they do not have a clear understanding of how shoppers behave in front of the category.

The solution in the present invention is based on proprietary technology that automatically measures shopper behavior in front of a category, and helps to understand the influence of causal factors, like assortment, promotions, displays and local competition, on shoppers' purchase decisions. It provides an in-depth understanding of who the category shoppers are, what they are buying or not buying, and how they are buying. Such in-depth understanding of shopper behavior will uncover hidden opportunities to grow the category.

Further, the present invention will provide demographic segmentation of the category shoppers by gender and age group. The shopping behavior of each demographic group will be analyzed to obtain segment-specific insights. Understanding segment-based shopper behavior for a specific category can help to develop effective customer-centric strategies to increase the basket size and loyalty of highest-opportunity segments.

The automated solution provides customers with fact-based insights to improve the overall performance of the category. The following provides a sample of the analysis types that the present invention employs to derive category-level behavior insights.

Category Traffic Flow Analysis

This analysis provides a complete picture of shopper traffic patterns in a particular category. For example, in the Laundry Care category, insights can be obtained about:
  common paths used to enter and exit the category,
  dominant direction of travel,
  the average browsing pace, and
  average shopping duration.

Insights from this analysis will enable retailers to take a fresh look at the amount of space devoted to categories and the location of these categories within stores. With a clear understanding of the traffic patterns for a given category, retailers can identify locations where shoppers will be more receptive to marketing initiatives.

Category Shopping Behavior Analysis

This analysis provides an in-depth understanding of how consumers actually shop the product category. For example, using the Laundry Care category, manufacturers and retailers can get first hand information on:

- the average number of laundry-related products shopped,
- whether the shoppers shopped detergent, softeners or stain removers first,
- the sequence in which detergents, softeners and stain removers were shopped, and
- the conversion rate for each of the sub-categories.

Such fact-based insights will empower retailers with information about the ideal product assortment to have on the shelf for a given category, while minimizing shelf space and the number of products stocked. This would create a convenient shopping experience for the category that effectively matches the needs of the shoppers.

Shopper Segmentation Analysis

Shopper segmentation analysis will offer insights about who the shoppers are for a particular category. In the case of the Laundry Care category, manufacturers and retailers can get insights about:

- key demographic segments (by gender, age-group and ethnicity) that shop the category,
- shopping patterns and preferences of each demographic segment, and
- characterization of shoppers based on their shopping missions and trip behavior.

A clear understanding of shopper segments and their purchase behavior for a category will enable manufacturers and retailers to develop successful customer-centric strategies that improve basket size and loyalty.

Benefits of Behavior Based Category Analysis

The automated behavior analysis technology in the present invention can help manufacturers and retailers to:

- improve category performance based on a deep understanding of category level behaviors,
- design effective retail programs by understanding market level shopper profiles and preferences,
- develop micro-marketing strategies that appeal to local demographic groups resulting in increased loyalty to the store and brand,
- implement efficient product assortment strategies that are complete, profitable and satisfy the customer needs, and
- enable efficient use of space in the store, resulting in an improved shopping environment, higher profits, and less frequent out-of-stocks.

The present invention measures and provides domain specific information in the category based on the category analysis. Examples of the domain specific information can comprise the following:

- sequence of products shopped in the category,
- ranking of products shopped in the category,
- product purchase pattern, and
- comparison of products that are interacted by the plurality of persons within the category.

The present invention also extracts analytic and statistical data from the category analysis. Examples of the analytic and statistical data can comprise the following:

- quantitative measurement per sub-category, such as a ratio between shopping interaction levels, level 2 over level 1 for a sub-category, based on actual measurement for the shopping interaction levels of the plurality of persons,
- maps: visualization of the quantitative measurement, whereby the map can use color-coded symbolic expression to differentiate the sub-category level shopping conversion among a plurality of persons at the category.
- dominant path measurement, which implies a specific decision pattern, because a finite number of next regions to choose from a "location A" defines the number of directions from that specific location and shows the tendency/preference of customers' decisions for the next path,
- sub-category sequence, which includes the order of engagement, and
- sub-category correlation of shopping paths for optimal distance among a plurality of sub-categories shopped, whereby the sub-category correlation can be represented in a multi-dimensional adjacency table or map.

FIG. 4 shows an exemplary shopping interaction levels that can be used as a criteria for the behavioral analysis of a plurality of persons in a category using the computer vision based tracking. The shopping interaction levels can be defined by a decision maker in a physical space based on the spatio-temporal relations. For example, the "table for shopping interaction levels" 938 divides the customer shopping interaction into "passing by", "noticing", "stopping", from "engaging 1" to "engaging P−1", and "purchase". They are labeled as "level 1" interaction, "level 2" interaction, "level 3" interaction, from "level 4" interaction to "level P−1" interaction, and "level p" interaction, respectively. Notice the engaging interaction can be further divided into multiple engaging levels depending on the level of engaging defined by a particular physical space where an embodiment of the present invention is located.

As shown in FIG. 4, the shopping interaction level in a category can be measured based on the temporal attribute of the person tracking for the customer. For example, if there is no change in velocity, the present invention can measure the customer's interaction level as a passer-by level at a particular category. In the exemplary embodiment shown in FIG. 4, if the stopping time Ti is greater than a threshold, such as T1 seconds, then the present invention can measure the customer's interaction level as a level 4 interaction. Likewise, the temporal attribute of the person tracking can match the time value to the corresponding interaction levels based on the predefined threshold and rules.

FIG. 5 shows an exemplary behavior measurement for an exemplary category based on the customers' interactions with sub-categories in the category for a plurality of different windows of time through a plurality of exemplary tables for behavior measurement.

In the exemplary tables in FIG. 5, the "Table for Behavior Measurement 1" 486 and the "Table for Behavior Measurement 3" 488 are exemplary behavior measurements for an exemplary category during different windows of time, from W1 (T1~Tn) to Wp (T1~Tn). Each row in the exemplary tables shows a string of behavior measurement for a customer during the window of time.

In the exemplary tables in FIG. 5, the number of customers per table can be various, and a customer in one table does not necessarily mean the same customer as another in another table just because both of them are designated by the same ID. Therefore, the customer 1 in the "Table for Behavior Measurement 1" 486 and the customer 1 in the "Table for Behavior Measurement 3" 488 are not necessarily the same customer.

In addition, the starting time, ending time, and length of the string of behavior measurement for each of the multiple customers during a window of time can be various because the customers appear and disappear in the field of view of the means for capturing images at a category in different patterns.

In the exemplary tables, each element in the string of behavior measurement for a customer during a window of time can be a 3-tuple, consisting of sub-category number, interaction level, and information with regard to the interaction with the products in the sub-category.

For example, the string of behavior measurement for the customer 1 in the "Table for Behavior Measurement 1" 486 consists of (C1,PB,P1), (C2,PB,P2), (C3,L2,P3), (C4,PB,P4), where C1, C2, C3, and C4 mean sub-category numbers, PB means passing-by interaction, L2 means level 2 interaction, and P1, P2, P3, and P4 mean product numbers that the corresponding sub-category in the 3-tuple is associated with.

In another exemplary row, the string of behavior measurement for the customer 2 in the "Table for Behavior Measurement 1" 486 consists of (C1,PB,P1), (C3,L2,P3), (C2,PB,P2), . . . , (C4,PB,P4), (C5,L3,P5), where C1, C2, C3, C4, and C5 mean sub-category numbers, PB means passing-by interaction, L2 means level 2 interaction, L3 means level 3 interaction, and P1, P2, P3, P4, and P5 mean product numbers that the corresponding sub-categories in the 3-tuple are associated with, respectively. Therefore, the second 3-tuple element, (C3,L2,P3), in the string means that the customer 2 was in the sub-category 3, and the customer's behavior was measured as level 2 interaction, while the customer interacted with the product number 3 in the sub-category 3, within the window of time W1.

Based on the plurality of exemplary tables for behavior measurement and accumulated statistics for the customer behavioral patterns, various behavior analyses are possible.

In another exemplary behavior analysis, the present invention can calculate the percentage of visits per each sub-category compared to all the visits to sub-categories after the customer approached a predefined object in the category, such as 10% for sub-category 1, 11% for sub-category 2, and so on, after the customer approached the predefined object in the category during the window of time W1. In this example, the order of visits is not taken into consideration.

However, in another exemplary behavior analysis, the present invention can also calculate the percentage of visits for the sub-categories that the customer visited first, right after the customer approached the predefined object in the category, such as 30% of the customers first visited the sub-category 1 right after approaching the predefined object in the category, 20% of the customers first visited the sub-category 2 right after approaching the predefined object in the category, and so on. Likewise, the present invention can also calculate the last sub-category visit statistics right before the customers approached the predefined object in the category.

In addition to these analyses for the sequence and ordering of the sub-categories, in another exemplary behavior analysis, the present invention can also calculate the correlation among the sub-categories. For example, the present invention can count the number of n-tuple sub-categories the customer visited before or after approaching the predefined object in the category, such as the number of visits for the 2-tuple sub-categories, [(C1,PB,P1), (C2,PB,P2),], [(C1,PB,P1), (C3,PB,P3),], [(C1,PB,P1), (C4,PB,P4),], [(C2,PB,P2), (C3,PB,P3),], [(C2,PB,P2), (C4,PB,P4),], and [(C3,PB,P3), (C4,PB,P4),]. In this measurement, the value of n in the n-tuple and the total number of sub-categories, denoted as $N_{tc}$, can be decided by the decision maker in a particular physical space. For example, the total number of sub-categories, $N_{tc}$, can be decided based on the available number of adjacent sub-categories from a category. Then the number of ways of grouping the un-ordered n-tuples among the total number of sub-categories, $N_{tc}$, becomes a simple process for calculating a binomial coefficient, which is "$N_{tc}$ C n: $N_{tc}$ choose n".

In another exemplary behavior analysis, the present invention can also calculate the dominant direction that the customer took after visiting a certain sub-category, based on the statistics. For example, if the percentage of [(C1,PB,P1), (C2,PB,P2),] is 60%, [(C1,PB,P1), (C3,PB,P3),] is 30%, and [(C1,PB,P1), (C4,PB,P4),] is 10%, we can learn a behavioral tendency in which more customers prefer the path toward sub-category 2 rather than paths toward sub-category 3 or 4, after visiting the sub-category 1.

Temporal Measures such as Dwell Time and Frequency

In-store activities can be tailored based on the length of time a customer spends in a given sub-category. Using this data, market research and retail store plan can be correlated to the perceived activity of the customer, based on the customer's dwell time in a particular sub-category.

The behavioral analysis can also comprise information for multiple visits to a specific sub-category by the same customer. This frequency pattern might trigger a series of related but progressively engaging or informing market activities. For example, the frequency in the trip information can steadily build awareness of a given product and increase the probability of purchase for a particular product.

FIG. 6 shows exemplary statistics of the behavioral information for each sub-category in a category based on the behavior measurement.

In the exemplary embodiment, as shown in the exemplary "table of behavior class measurement for sub-category 1" 610 and "table of behavior class measurement for sub-category N" 611, the statistics can be provided for a given window of time, such as from Tn−1 to Tn, and the present invention details the customers' behavioral statistics for the sub-category for that time increment. Each sub window of time, such as from Tn−1 to Tn, and the entire duration of the measurement period from T1 to Tn can be decided based on various business goals and levels of desired information composition in the category.

Statistical collection of the behavior analyses for each of the plurality of sub-categories in a category as shown in the tables can provide valuable marketing information to the owner of the present invention in the relevant retail space. Especially, it helps in analyzing a specific business element, as discussed above in regards to FIG. 1 through FIG. 3.

Figure 7:
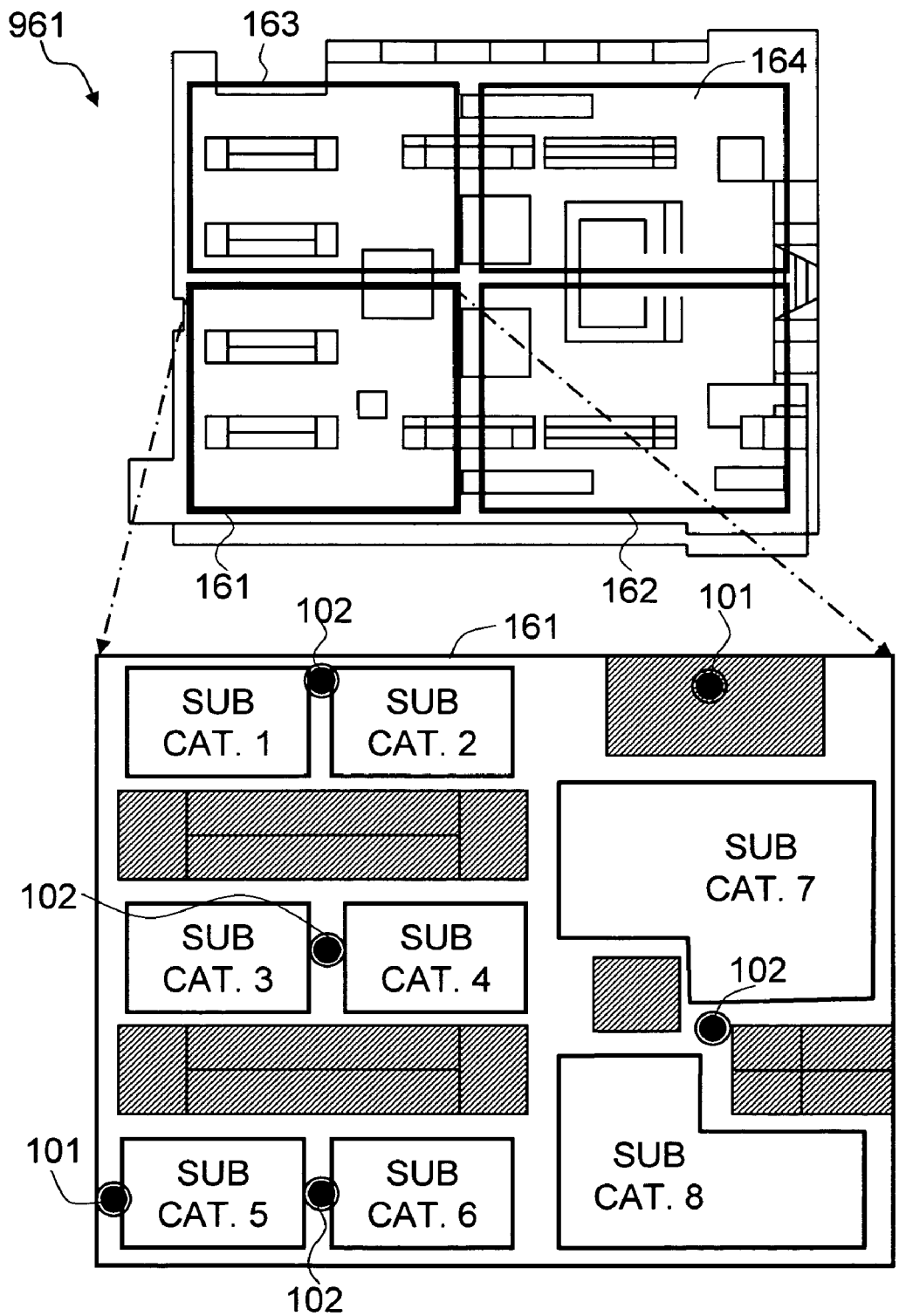
FIG. 7 shows an exemplary layout of categories in a physical space and exemplary sub-categories in a category, where the sub-categories are defined at the sub-region of a category level.

FIG. 7 shows an exemplary layout of categories 961 in a physical space and exemplary sub-categories in a category, where the sub-categories are defined at the sub-region of a category level.

As shown in the exemplary embodiment in FIG. 7, a physical space, such as a retail space, can be divided into a plurality of categories. Each of the plurality of categories can be further divided into a plurality of sub-categories. As defined earlier, a plurality of categories and a plurality of sub-categories are logical entities. Therefore, the type, size, and characteristics of the plurality of categories and a plurality of sub-categories can vary.

In the exemplary embodiment in FIG. 7, the physical space is divided into four exemplary categories: "category 1" 161, "category 2" 162, "category 3" 163, and "category 4" 164. The exemplary "category 1" 161 is further divided into eight sub-categories based on the sub-regions that are associated with certain types of the products in the sub-regions in the category.

In the exemplary embodiment in FIG. 7, a plurality of first means for capturing images 101 and a plurality of second means for capturing images 102 are installed in strategic locations in regards to the sub-categories in the exemplary "category 1" 161.

Figure 8:
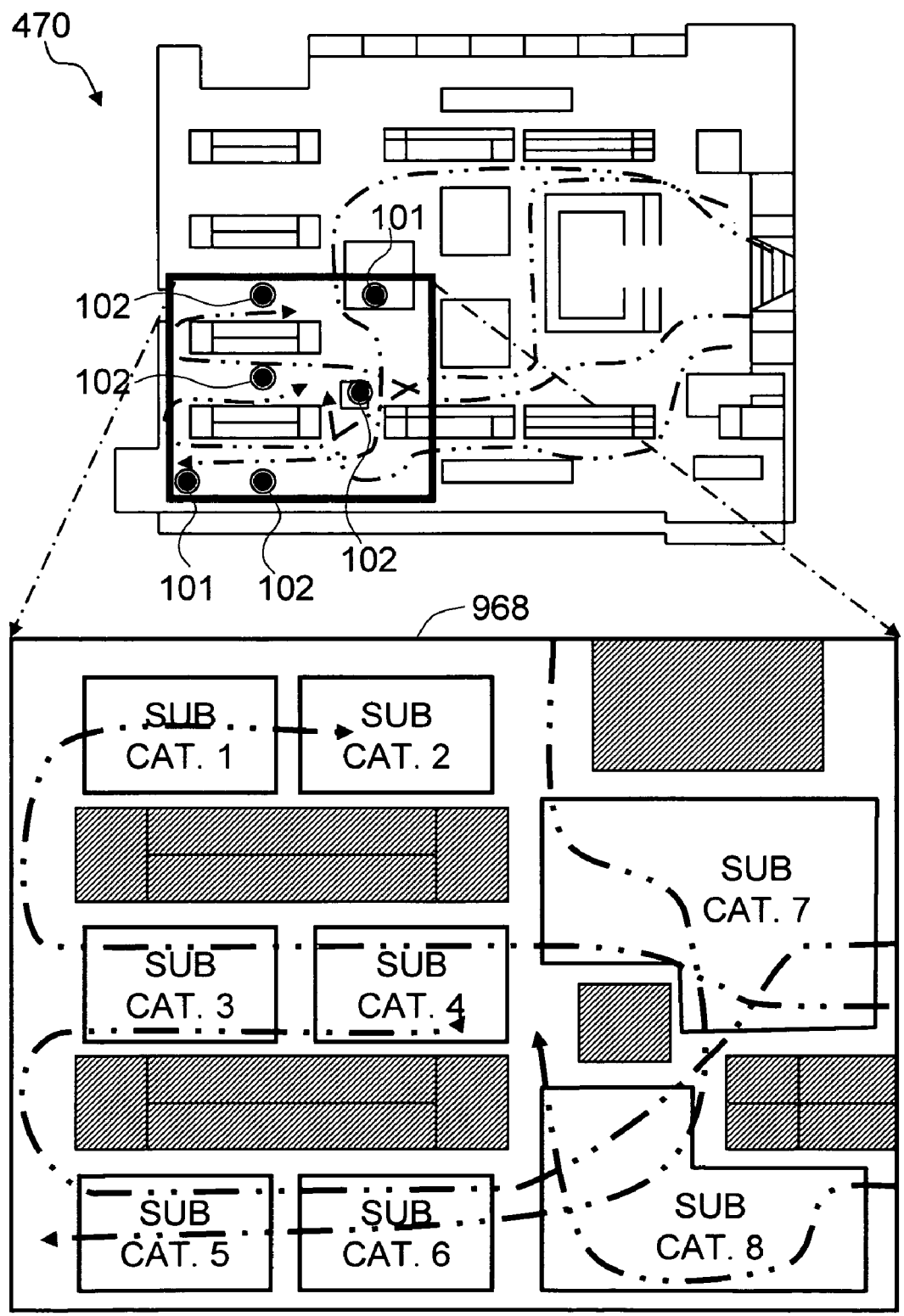
FIG. 8 shows exemplary path analysis of a plurality of persons in regards to a category in a physical space and exemplary quantitative measurement per sub-category, using a plurality of first means for capturing images and a plurality of second means for capturing images.

FIG. 8 shows exemplary path analysis 470 of a plurality of persons in regards to a category in a physical space and exemplary quantitative measurement per sub-category, using a plurality of first means for capturing images 101 and a plurality of second means for capturing images 102.

In the exemplary embodiment shown in FIG. 8, a plurality of tracks by the tracking of a plurality of persons is used for the path analysis in a category, using a plurality of first means for capturing images 101 and a plurality of second means for capturing images 102. Especially, the plurality of second means for capturing images 102 can be used for finer level of details in the customers' path analysis and behavior analysis.

Especially, with regard to the exemplary category, a "quantitative measurement for sub-categories in the category" 968 can be performed based on the path analysis in the sub-category level. As explained in regards to FIG. 5, the exemplary behavior measurement for an exemplary category can be based on the customers' interactions with sub-categories in the category, and the "quantitative measurement for sub-categories in the category" 968 can provide an exemplary measurement for the customers' interactions with sub-categories, and vice versa.

Examples of quantitative measurement per sub-category can comprise a ratio between shopping interaction levels, such as level 2 over level 1 for a sub-category, based on actual measurement for the shopping interaction levels of the plurality of persons. For example, in the exemplary tables for behavior measurement in regards to FIG. 5, if the counts for (C3,L2,P3) are approximately four times larger than that of (C3,L3,P3), we can learn that about 25% of the customers at sub-category 3 moved from level 2 interaction to level 3 interaction, and the ratio of level 3 over level 2 is 1:4.

Figure 9:
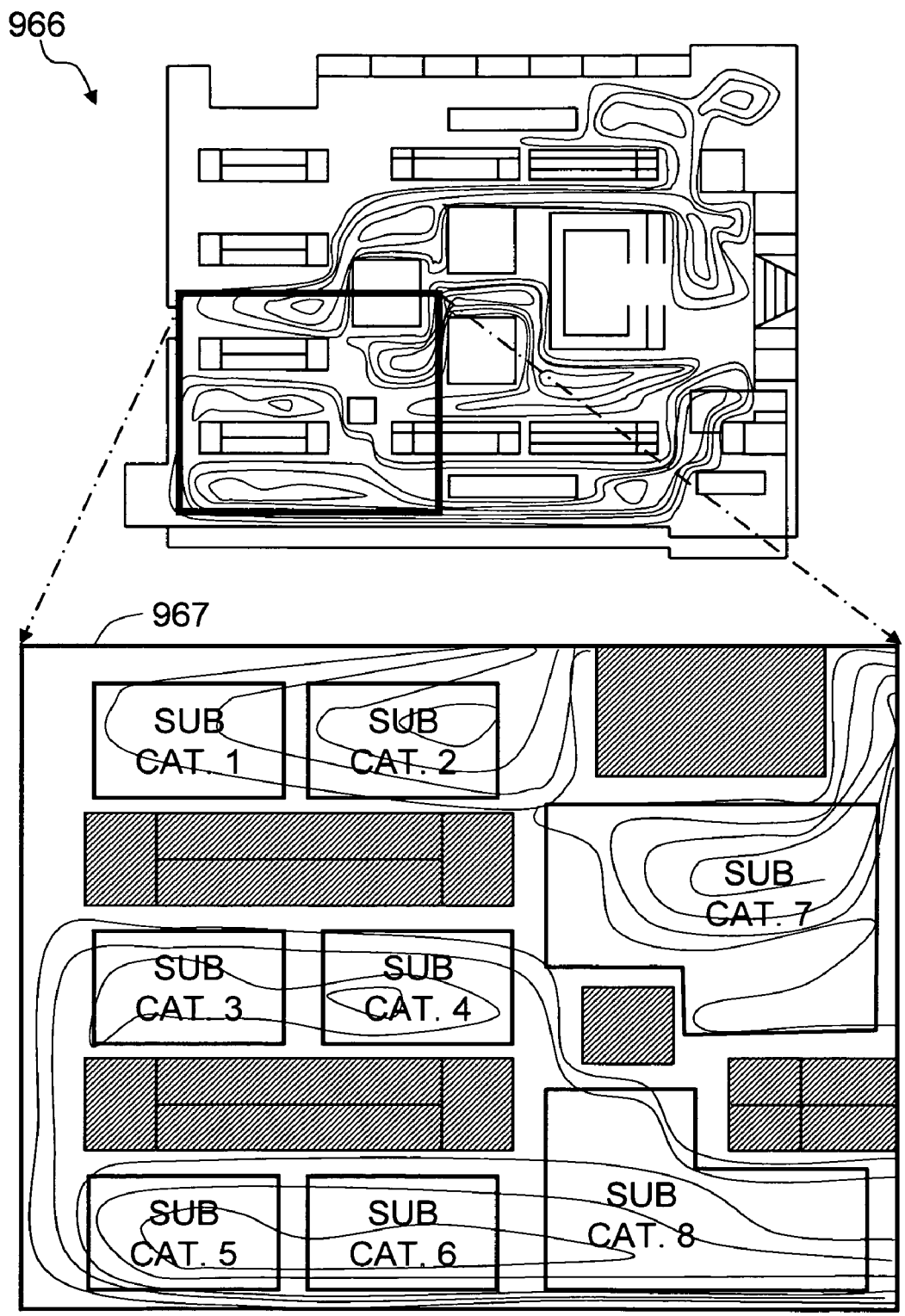
FIG. 9 shows an exemplary map as a display of visualization for quantitative measurement for behavior of customers in a category for overall understanding of shopping behavior, based on tracking of a plurality of persons in regards to a category.

FIG. 9 shows an exemplary map as a display of visualization for quantitative measurement for behavior of customers in a category for overall understanding of shopping behavior, based on tracking of a plurality of persons in regards to a category.

The path analysis 470, based on the tracking of the customers, and the "quantitative measurement for sub-categories in the category" 968 in the exemplary embodiment shown in FIG. 8 can be used to create a map 966 as a data representation/visualization of the quantitative measurement. Especially, with regard to the exemplary category, the "map of a category" 967 shows a visualization of the quantitative measurement for customers' shopping interaction at a specific category. The "map of a category" 967 can use color-coded symbolic expression to differentiate the sub-category level shopping conversion among a plurality of persons at the category.

Figure 10:
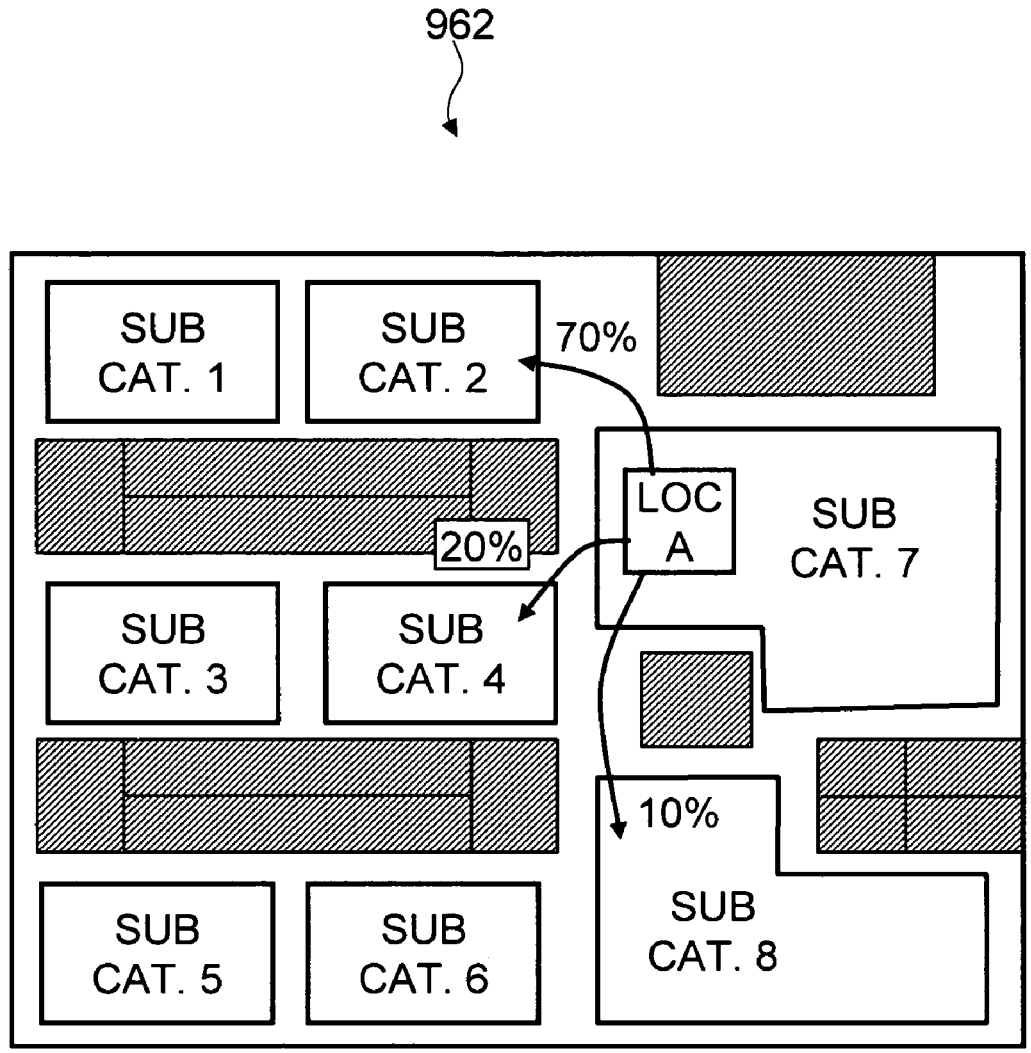
FIG. 10 shows an exemplary measurement of dominant path, which implies specific decision pattern, from a location in a sub-category.

FIG. 10 shows an exemplary "measurement of dominant path" 962, which implies specific decision pattern, from a location in a sub-category.

The dominant path measurement implies a specific decision pattern. There are a finite number of next regions to choose from an exemplary "location A". The finite number of next regions also defines the number of available directions from that specific location. Therefore, the measurement of dominant path 962 shows the tendency and preference of customers' decisions for the next path to a sub-category among the sub-categories in a category.

In the exemplary embodiment shown in FIG. 10, 70% of customers chose sub-category 2 from a location A in the sub-category 7, while 20% of customers chose sub-category 4 and 10% of customers chose sub-category 6. This shows there is a tendency that people prefer to choose the path to sub-category 2 from a location A in the sub-category 7.

Figure 11:
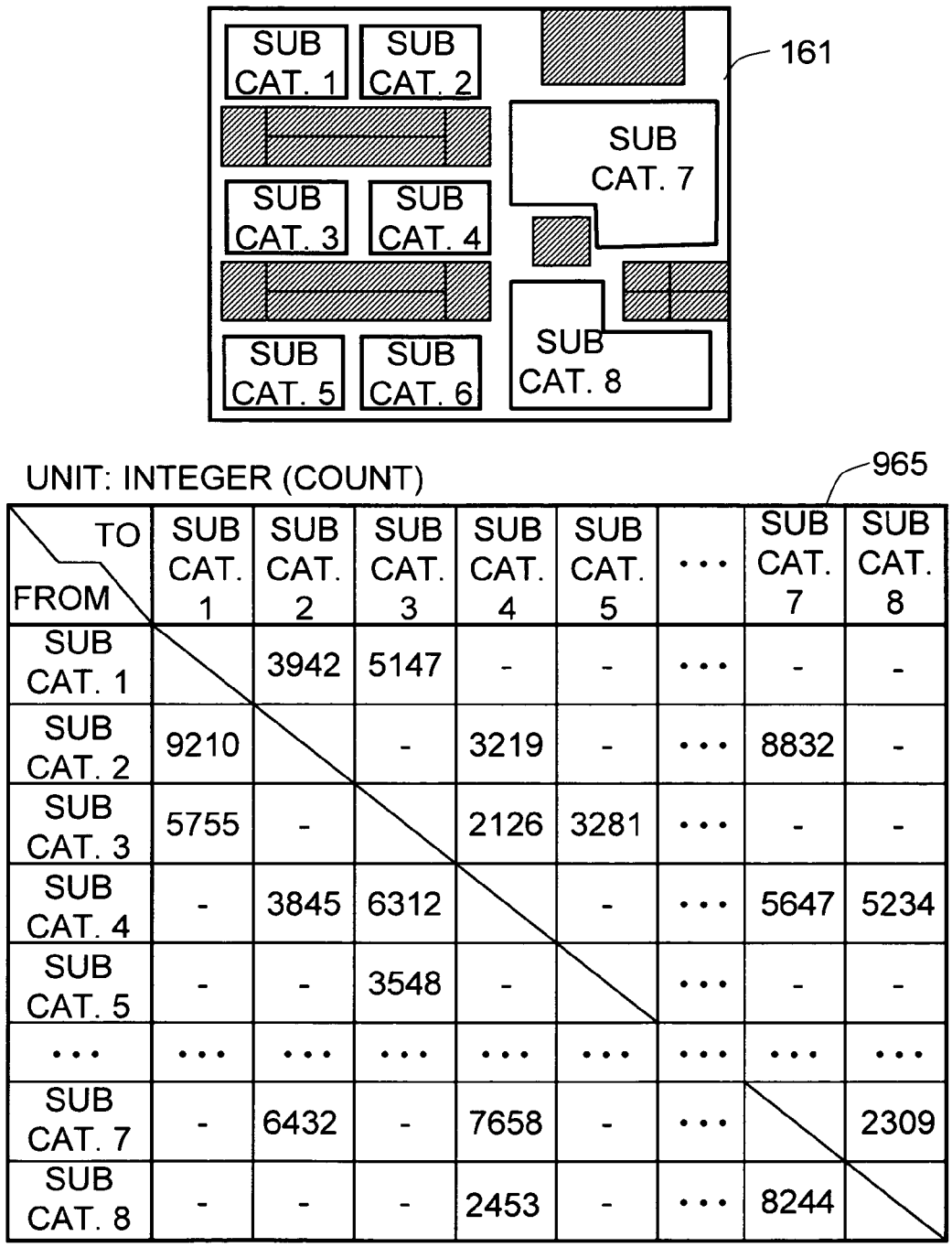
FIG. 11 shows an exemplary table for sub-category sequence measurement among a plurality of sub-categories in a category.

FIG. 11 shows an exemplary table for sub-category sequence 965 measurement among a plurality of sub-categories in a category.

The present invention can measure the sub-category sequence based on the customers' behaviors and shopping interaction levels to the predefined sub-categories in a category, such as the exemplary category 1 161 in the exemplary embodiment shown in FIG. 11. The sub-category sequence can show the order of engagement.

The "table for sub-category sequence" 965 is an exemplary embodiment of a table, which measures sequence relationship among a plurality of sub-categories. For example, the first row of the table shows that there were 3942 customers who visited sub-category 2, and 5147 customers who visited sub-category 3 after visiting sub-category 1. The 2-dimensional arrays of values in the "table for sub-category sequence" 965 in FIG. 11 show the measured counts for the adjacent categories that the customers immediately visited right after visiting a sub-category in the leftmost column of the table. However, the length of the sub-category sequences that are measured can be extended further. In another exemplary embodiment of the table for sub-category sequence, the table can measure three sequences of sub-categories the customers visited one by one, using 3-dimensional arrays of values.

The sub-category sequence pattern can be one of the behavioral measurements for which the path analysis can provide a basis. With regard to this data, the sub-category sequence can comprise what sub-categories the customers have shopped most recently, the sub-categories they are most likely to shop next or some relevant combination of previously shopped sub-categories. This sub-category sequence can be used to provide information for a product that has already been interacted with or reference a product that is likely to be interacted with in the near future based on the customer's behavior, thus improving the probability of purchase for the product.

Figure 12:
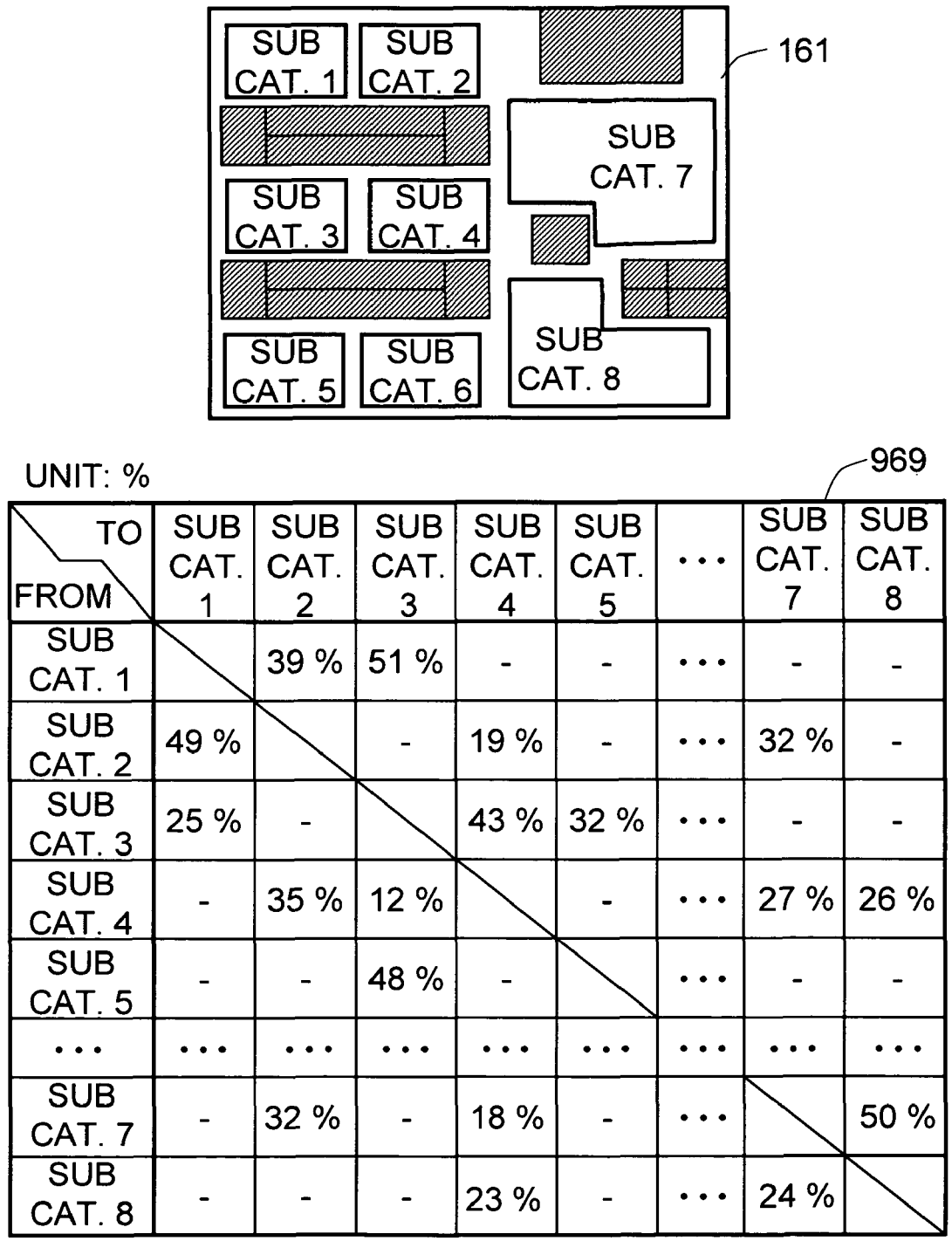
FIG. 12 shows an exemplary table for sub-category correlation measurement among a plurality of sub-categories in a category.

FIG. 12 shows an exemplary table for sub-category correlation 969 measurement among a plurality of sub-categories in a category.

The sub-category correlation of the customers' shopping paths can show the optimal distance among a plurality of sub-categories shopped. The sub-category correlation can be represented in a multi-dimensional adjacency table or map.

In the exemplary table for sub-category correlation 969, the measurement shows what percentage of people made a shopping trip from a sub-category in the leftmost column to a sub-category in the uppermost row. Then, both of the corresponding sub-categories are grouped into a couple, and the couple is compared against other couples, which can be made from the same sub-category in the leftmost column to another sub-category in the uppermost row.

For example, the first row of the table shows that there were 39% of (sub-category 1, sub-category 2) couples and 51% of (sub-category 1, sub-category 3) couples among all the possible couples between the sub-category 1 and another sub-category among the rest. In this exemplary embodiment, the adjacency and order of engagement were also considered into the counting of the sub-category correlation measurement, but in another exemplary embodiment, the sub-category correlation measurement may not take the adjacency and order of engagement into consideration. Furthermore, in another exemplary embodiment, the sub-category correlation measurement may take three or more sub-categories into the coupling to measure the multi-dimensional correlation among the sub-categories.

Figure 13:
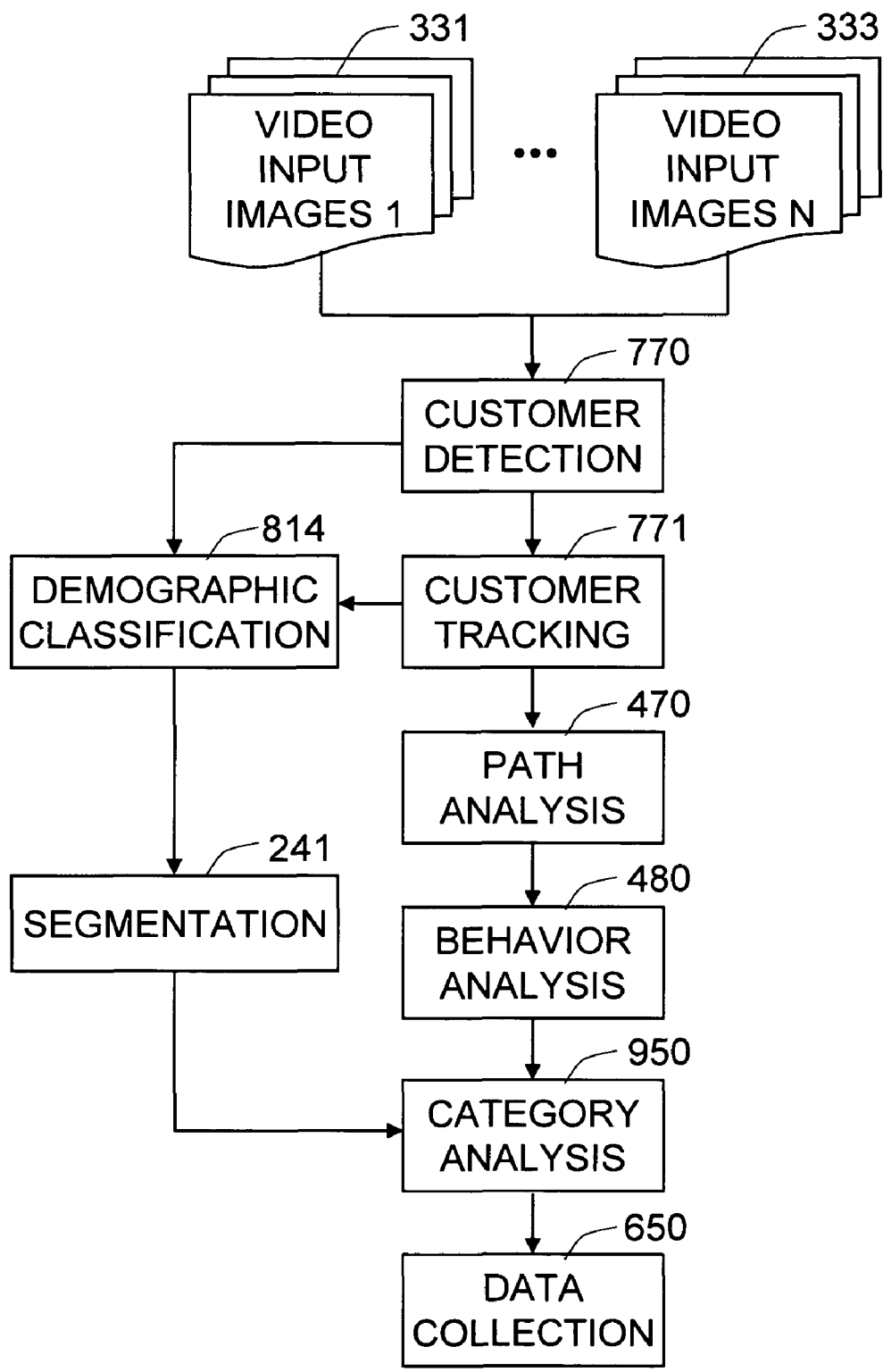
FIG. 13 shows an exemplary process of single customer tracking and behavior analysis in regards to sub-categories of a category in an exemplary embodiment of the invention.

FIG. 13 shows an exemplary process of single customer tracking and behavior analysis in regards to sub-categories of a category in an exemplary embodiment of the invention.

In the exemplary embodiment, the present invention detects 770 and tracks 771 the customer in the video input images, from "video input images 1" 331 to "video input images N" 333, from a plurality of first means for capturing images 101. The present invention joins the trajectories of the customer tracks from a video of a first means for capturing images 101 to another video of a first means for capturing images 101 while the customer appears and disappears between the fields of view among a plurality of first means for capturing images 101. Based on the tracking information, the present invention analyzes the path of the customer and the path analysis 470 can be used as one of the ways to process the behavior analysis 480 of the customer and obtain useful information about the customer's behavior, such as shopping behavior, in regards to the sub-categories in a category.

The present invention can utilize any reliable video-based tracking method for a single customer and a group of customers in the prior art in regards to the behavior analysis. For example, U.S. Pat. No. 7,930,204 of Sharma, et al. (hereinafter Sharma 1) disclosed an exemplary process of video-based tracking and behavior analysis for a single customer or a group of customers using multiple means for capturing images in a preferred embodiment of the invention.

The present invention can also process segmentation 241 of the customer based on the images of the customer in the video. Demographic classification 814 can be an exemplary segmentation 241 of the customer.

The present invention can utilize any reliable demographic composition measurement method in the prior art as an exemplary video-based segmentation of the customers. For example, U.S. Provisional patent No. 60/808,283 of Sharma, et al. (hereinafter Sharma 2) disclosed an exemplary demographic composition measurement based on gender and ethnicity.

The present invention processes the category analysis 950 based on the behavior analysis 480 and the segmentation 241 of the customers, and processes the data collection 650 of the measurement and analyses.

Figure 14:
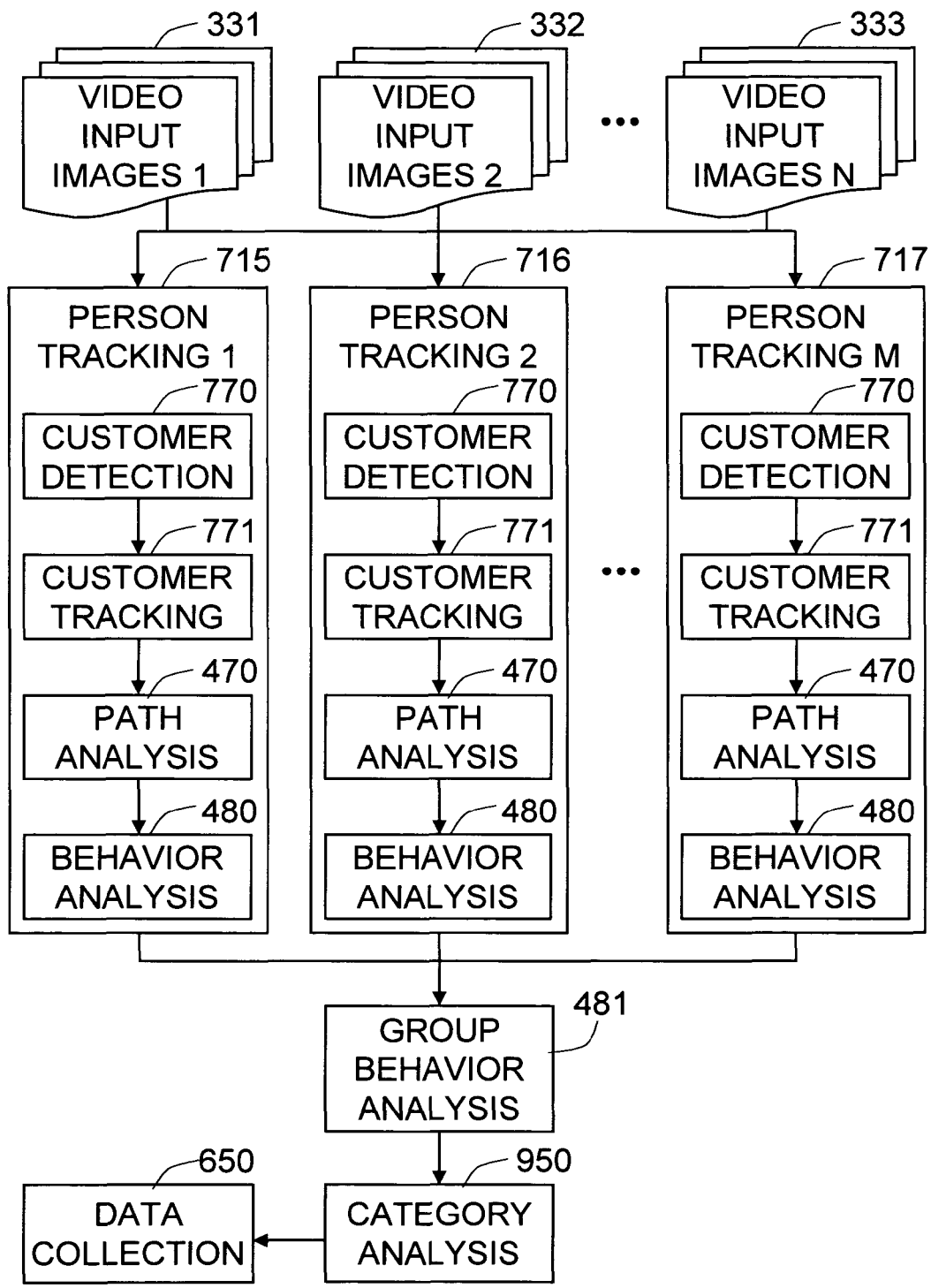
FIG. 14 shows an exemplary process of tracking and behavior analysis for a group of customers in regards to sub-categories of a category in an exemplary embodiment of the invention.

FIG. 14 shows an exemplary process of tracking and behavior analysis for a group of customers in regards to sub-categories of a category in an exemplary embodiment of the invention.

In the exemplary embodiment, the present invention repeats the person tracking for each customer that appears in the field of view of a plurality of first means for capturing images 101. When the present invention detects a group of customers is approaching a category, the present invention analyzes the group behavior by the aggregated behavior analyses from the individual person tracking information, such as the "person tracking 1" 715, "person tracking 2" 716, and "person tracking M" 717. The group behavior analysis 481 can be decided by a set of predefined rules, such as a majority rule, in which the major characteristics among the aggregated individual behavior analyses represent the entire group behavior. The category analysis 950 can be based on the representative behavior characteristics of the group of people in this exemplary embodiment.

Figure 15:
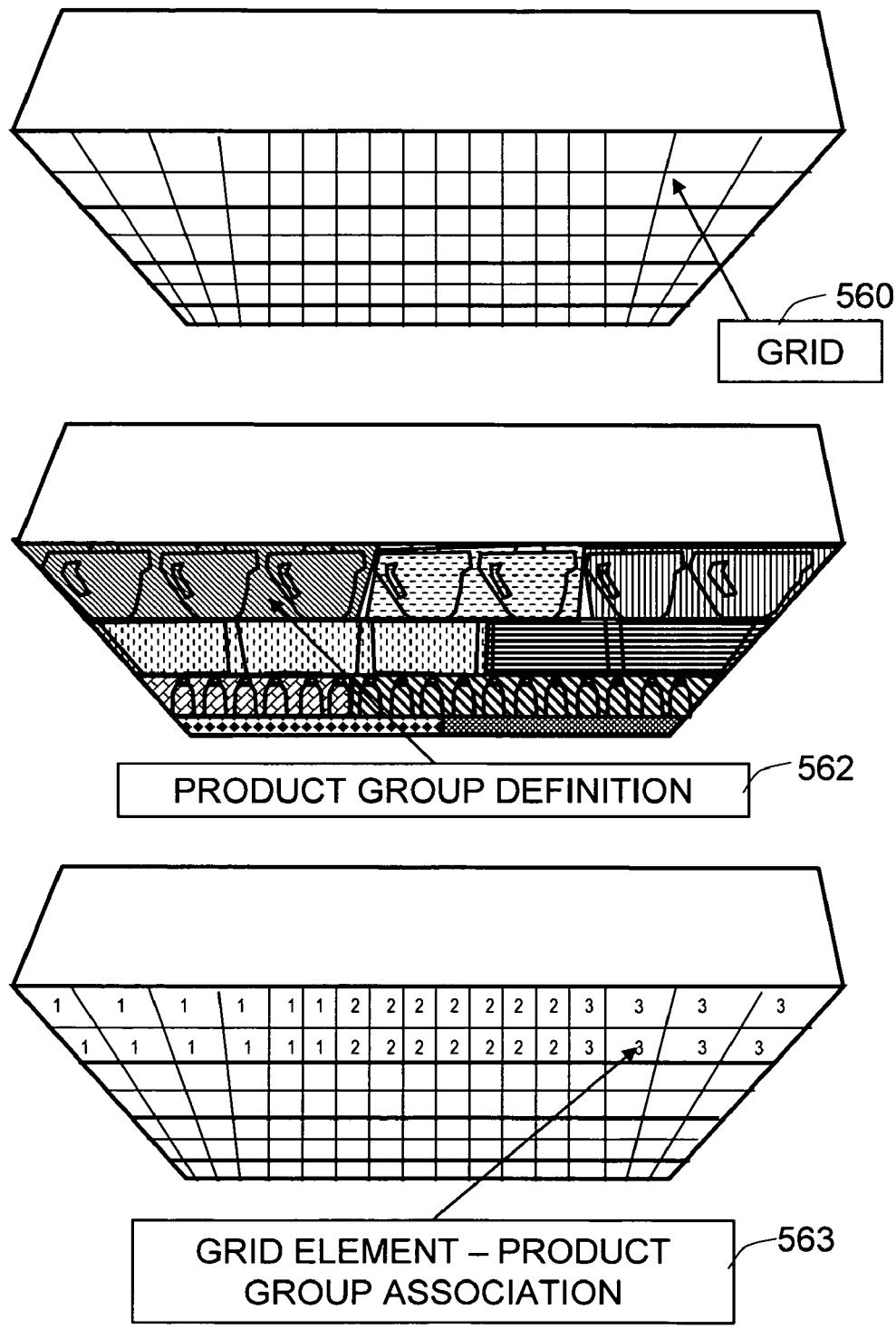
FIG. 15 shows another exemplary layout of sub-categories in a category, where the sub-categories are defined at the product group level.

FIG. 15 shows another exemplary layout of sub-categories in a category, where the sub-categories are defined at the product group level.

In the exemplary embodiment shown in FIG. 7, an exemplary "category 1" 161 was further divided into eight sub-categories based on the sub-regions that are associated with certain types of the products in the sub-regions in the category.

However, in another exemplary embodiment shown in FIG. 15, an exemplary category can be divided into sub-categories in association with the product groups on shelves in a category based on the product group definition 562. While the exemplary category analysis based on the behavior analysis for the sub-categories of the category in the exemplary embodiment shown in FIG. 7 rely on the path analysis of the customers, the category analysis in the exemplary embodiment shown in FIG. 15 rely on the customers' interactions with the product groups on shelves and the association of the product group with the grid element, such as the "grid element—product group association" 563 in FIG. 15.

Therefore, in this exemplary embodiment, the present invention may use a plurality of first means for capturing images to detect the customers' presence in the vicinity of a plurality of sub-categories, defined at the product group level, in a category. Then the present invention may use a plurality of second means for capturing images to detect the customers' shopping interaction with the product groups in association with the sub-categories on shelves.

Figure 16:
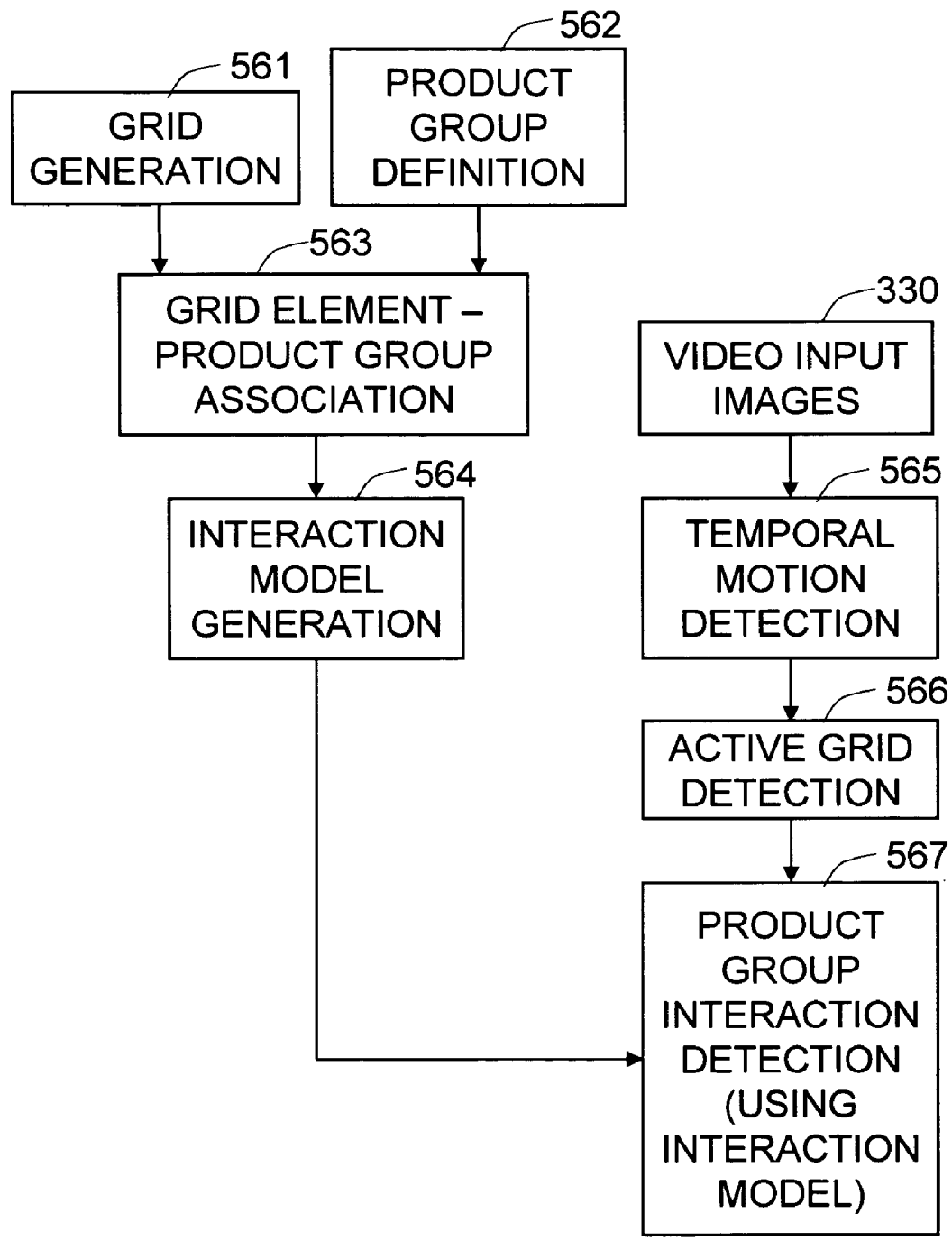
FIG. 16 shows an exemplary setup phase and interaction detection process for the sub-categories in a category, where the sub-categories are defined at the product group level.

FIG. 16 shows an exemplary setup phase and interaction detection process for the sub-categories in a category, where the sub-categories are defined at the product group level.

Product Group Interaction Detection:

Product group interaction detection is achieved by building a model through a interaction model generation 564 process, during the setup phase, and using output from computer vision algorithms in conjunction with that model to detect the interaction of any customer with any defined product group, such as the product group definition 562.

During the setup phase a polygon is drawn around the shelf or shelves of interest. The grid generation 561 module then divides the region into logical grid elements in a grid 560 by taking the perspective distortion due to the camera view into account, as shown in FIG. 15. In an exemplary embodiment, the grid elements can have IDs that start at a certain number, such as zero or one, on the top left corner and progressively scan the grid elements till the bottom right. During the setup phase, regions on the shelf that make up a product group are marked by drawing polygons around the corresponding regions.

Once this is done, the grid assignment module matches all the grid elements that match each product group by checking for intersection of the grid element with the regions. Then the logic generation module uses the perspective projection of the camera and generates a look up table for deciding which region to pick when more than one grid element is active. Active grid elements are those that have temporal motion in them. When more than one grid element is active, the element IDs are arranged in increasing order and the lowest ID is used to look up for the region to select.

Once the setup is finished, the video from the camera is processed by a module that detects temporal motion, such as the temporal motion detection 565, at every pixel in the image. Then the grid elements that have a minimum threshold of pixel with motion are marked as active grid elements at the active grid detection 566 process. Then the look up logic module is used to determine which region is being interacted with to find the right product group at the product group interaction detection 567 process.

The temporal motion can be calculated based on frame differencing method. In another exemplary embodiment, any reliable hand tracking method can also replace the temporal motion detection for detecting the interaction of the customers with the grid elements for a sub-category. U.S. Pat. No. 7,274,803 of Sharma, et al. (hereinafter Sharma 3) disclosed an exemplary process of method and system for detecting conscious hand movement patterns and computer-generated visual feedback for facilitating human-computer interaction.

Figure 17:
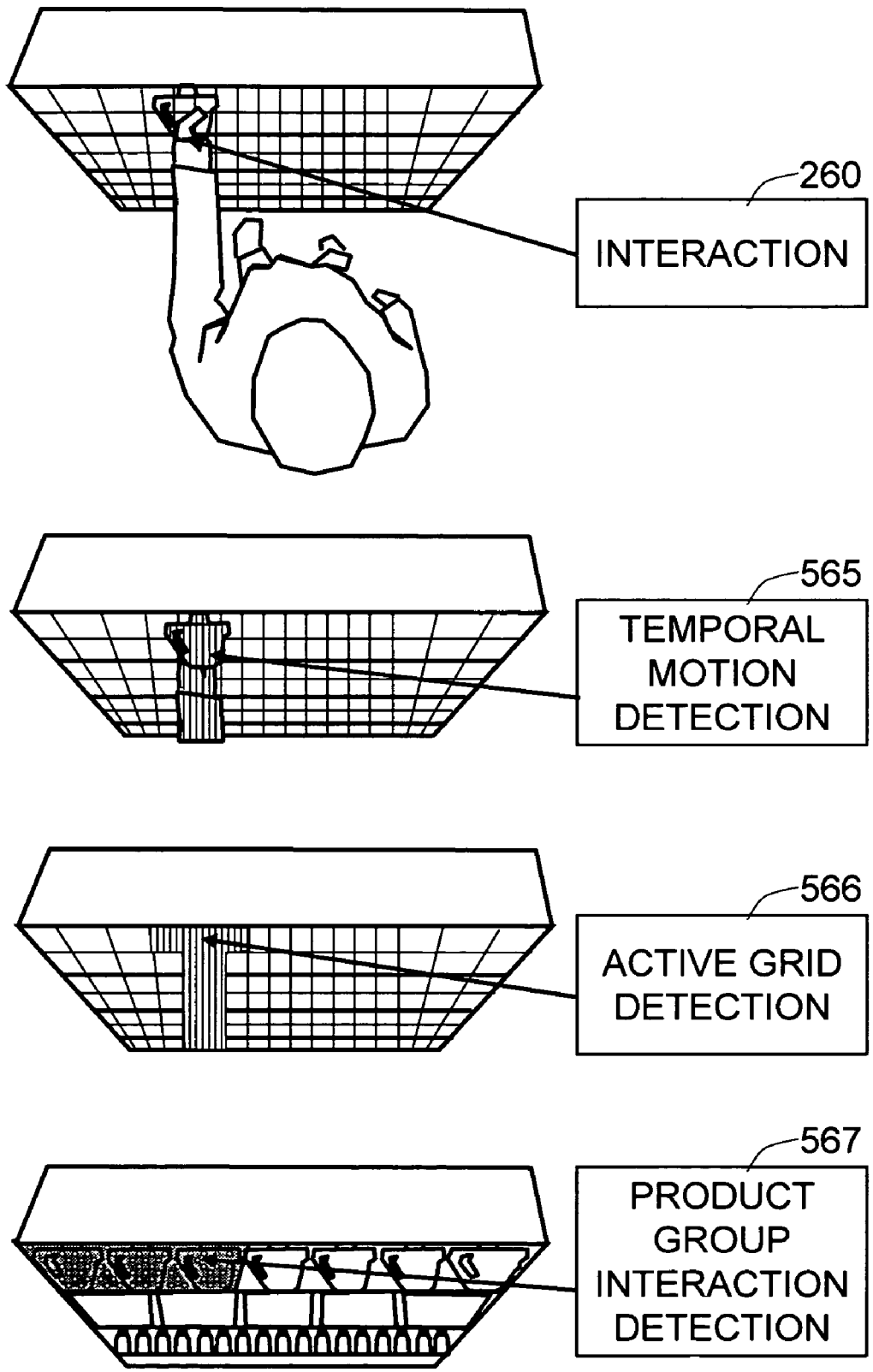
FIG. 17 shows an exemplary interaction with a region for a sub-category among the sub-categories in a category, where the sub-categories and regions are defined at the product group level.
Figure 18:
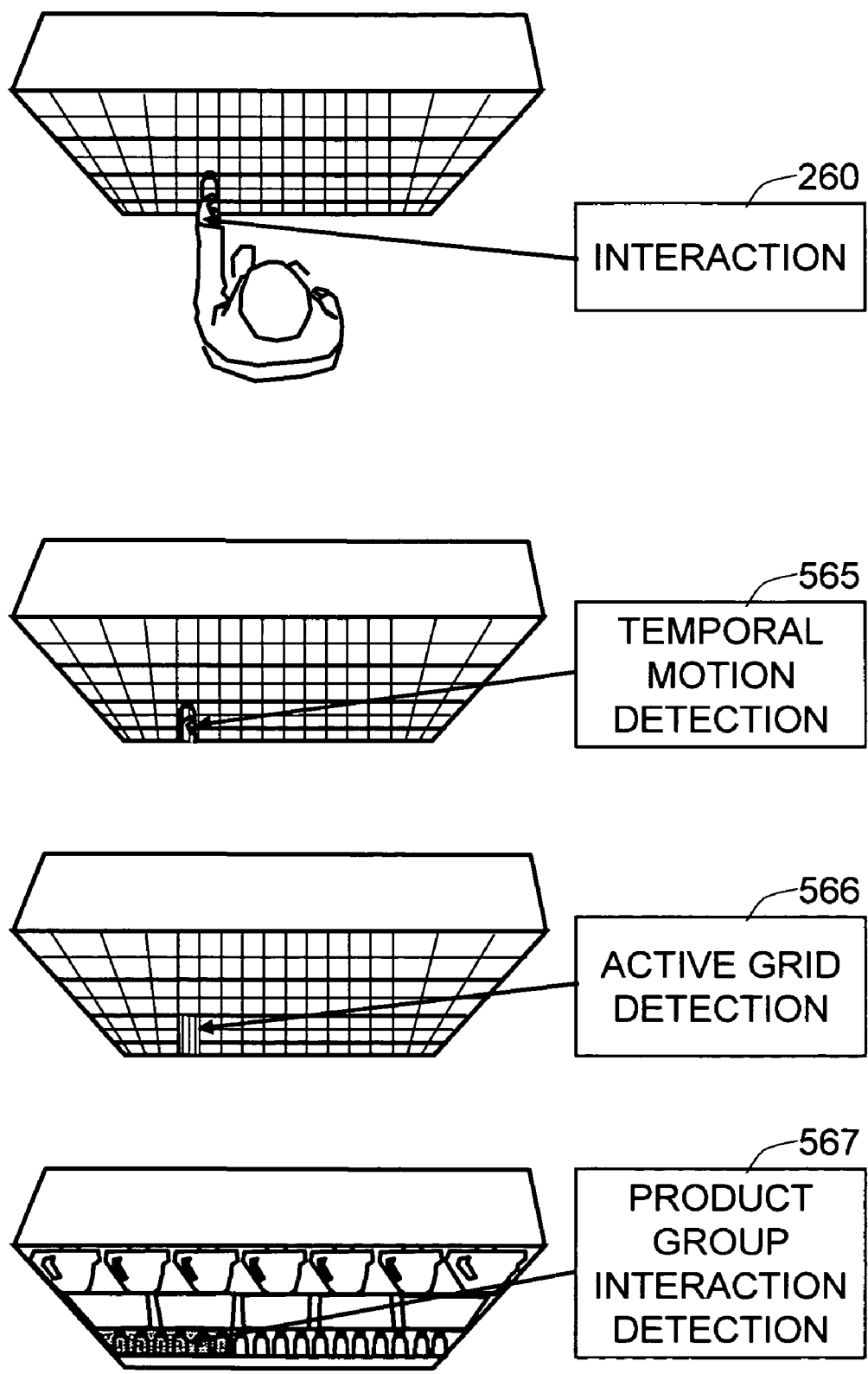
FIG. 18 shows another exemplary interaction with another region for a sub-category among the sub-categories in a category, where the sub-categories and regions are defined at the product group level.

FIG. 17 shows an exemplary interaction with a region for a sub-category among the sub-categories in a category, where the sub-categories and regions are defined at the product group level. FIG. 18 shows another exemplary interaction with another region for a sub-category among the sub-categories in a category, where the sub-categories and regions are defined at the product group level.

Based on the described processes for the product group interaction detection process for a sub-category in regards to FIG. 16, the present invention can detect a plurality of interactions of customers with sub-categories in the category, especially at the product group level, and the accumulated detection data can provide important information for the category analysis that are described above.

Figure 19:
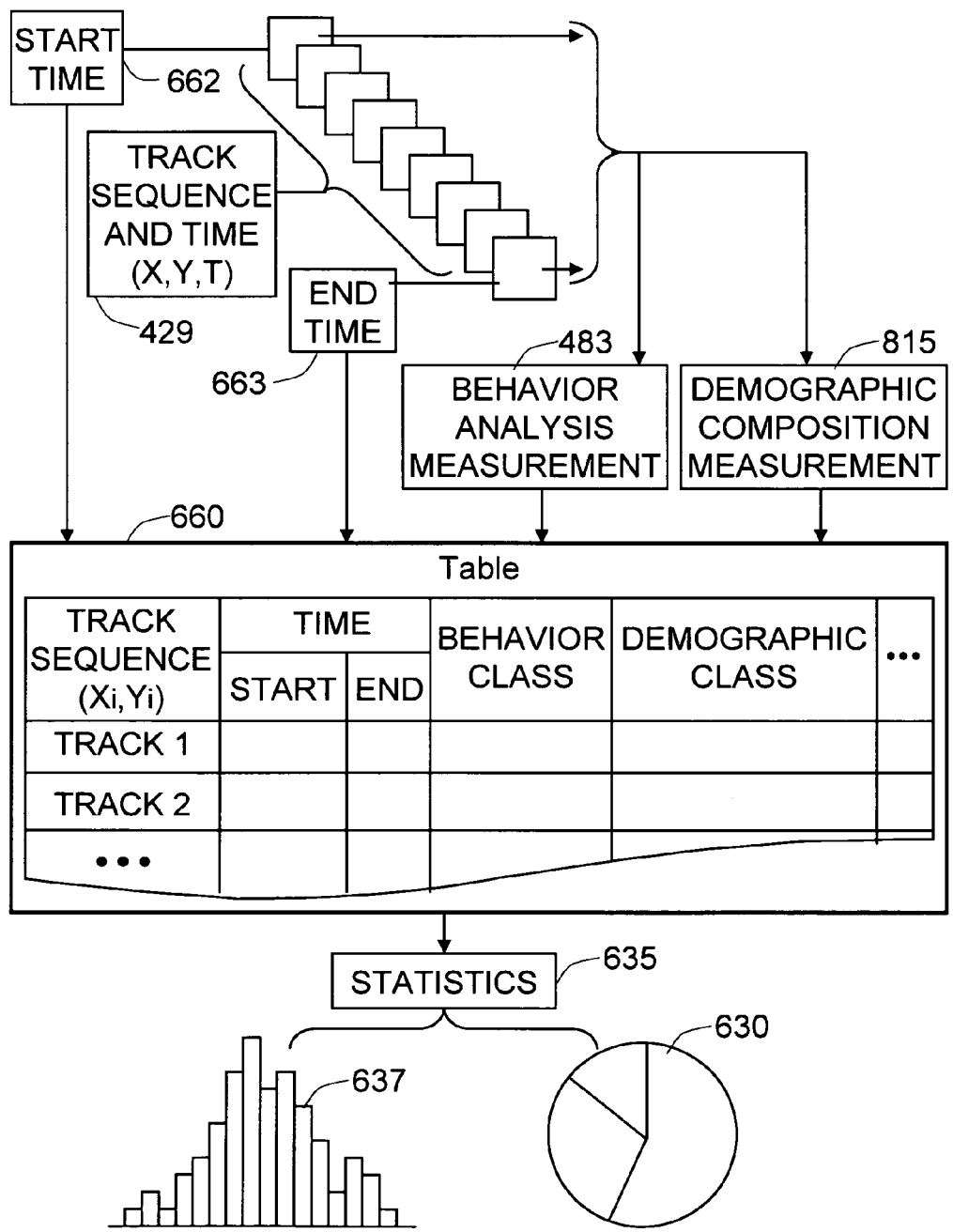
FIG. 19 shows an exemplary data storage process in an exemplary embodiment of the present invention.

FIG. 19 shows an exemplary data storage process in an exemplary embodiment of the present invention. In the exemplary embodiment, the system can store the data in a table 660, where each track has fields of values: exemplary attributes can be time stamps (start time 662 and end time 663 of the video-based tracking sequence 429 for person appearance and disappearance in a category), behavior class by the behavior analysis measurement 483 process, demographic class by the demographic composition measurement 815 process, and so on.

The exemplary data can be used to collect statistics 635 of the behavior analysis and demographic composition of the customers, and the statistics 635 can be represented as a pie chart 630, as a bar graph 637, or any data representation means in the exemplary embodiment. The data is accessible by the programming module, so that the system can directly and automatically utilize the statistical data for the category analysis.

Figure 20:
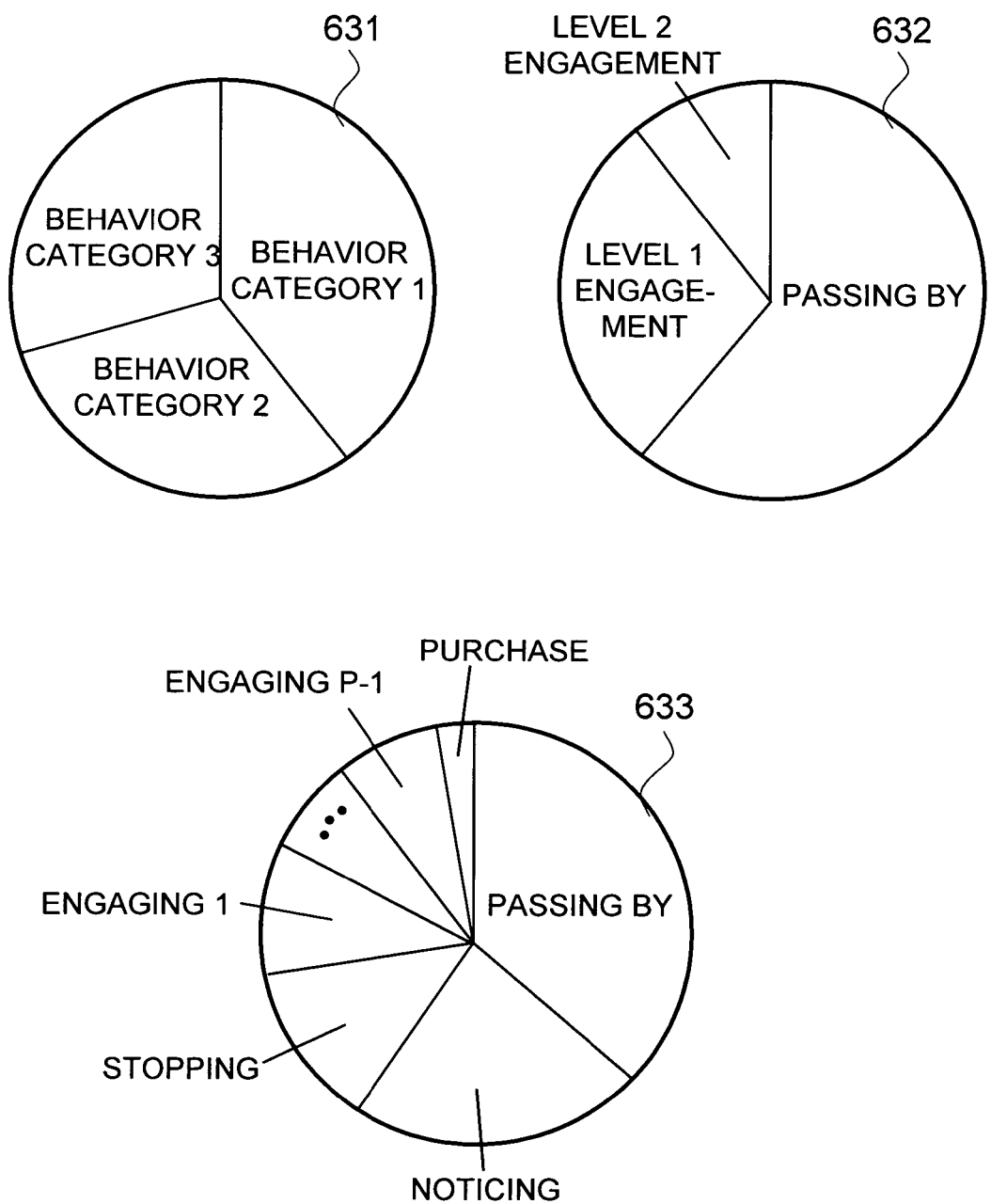
FIG. 20 shows exemplary pie charts of the exemplary behavioral analysis measurement from a category, where the pie charts provide useful category analysis information to the decision maker, who owns an embodiment of the present invention, in a physical space.

FIG. 20 shows exemplary pie charts of the exemplary behavioral analysis measurement from a category, where the pie charts provide useful category analysis information to the decision maker, who owns an embodiment of the present invention, in a physical space. In FIG. 20, an exemplary "pie chart for behavior classification 1" 631, an exemplary "pie chart for behavior classification 2" 632, and an exemplary "pie chart for behavior classification 3" 633 are shown. The exemplary "pie chart for behavior classification 1" 631 divided the behavior patterns into three different behavior categories. The exemplary "pie chart for behavior classification 2" 632 divided the behavior patterns into "passing by", "level 1 engagement", and "level 2 engagement". The exemplary "pie chart for behavior classification 3" 633 further divided the behavior patterns into "passing by", "noticing", "stopping", "from engaging 1 to engaging P−1", and "purchase". There can be multiple engaging levels between the "engaging 1" and the "engaging P−1". The present invention enables the decision maker, who owns an embodiment of the present invention in a physical space, to query the category analysis statistical data, which is processed based on the actual measurement for the customers' shopping behaviors.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for automatically analyzing a category in a physical space based on video-based behavior analysis of a plurality of persons with regard to said category in the physical space, comprising the following steps of:
   a) capturing a plurality of input images of said plurality of persons by a plurality of means for capturing images in the area with regard to said category,
   wherein the means for capturing images includes at least a camera,
   b) processing said plurality of input images in order to process a video-based behavior analysis of each person in said plurality of persons using at least a computer that executes computer vision algorithms for said plurality of input images,
   wherein the computer vision algorithms include algorithms for person tracking, hand motion detection, and demographic classification,
   c) analyzing the category based on the accumulation of said video-based behavior analysis for said plurality of persons, and
   d) measuring the effect after making a change at the category level,
   whereby the analysis of said category facilitates an analysis of level of engagement and decision process at the category level, and
   whereby said change comprises change in the quantity, price, and position of certain products in said category.

2. The method according to claim 1, wherein the method further comprises a step of measuring domain specific information in said category,
   whereby said domain specific information comprises sequence of products shopped in said category, ranking of products shopped in said category, product purchase pattern, and comparison of products interacted by said plurality of persons within said category.

3. The method according to claim 1, wherein the method further comprises a step of analyzing the shopping pattern of said plurality of persons when a shelf space in shelves that are located in regards to said category is empty.

4. The method according to claim 1, wherein the method further comprises a step of calculating the frequency of replenishing a certain product in shelves that are located in regards to said category,
   whereby the calculation increases the efficiency in inventory management of the product.

5. The method according to claim 1, wherein the method further comprises a step of calculating optimal size and height of shelves that are located in regards to said category based on shopping interaction analysis in regards to said shelves.

6. The method according to claim 1, wherein the method further comprises a step of calculating optimal layout for shelves that are located in regards to said category,
   whereby said optimal layout provides information for optimal position of a product, optimal number of products, efficient product assortment, and optimal type of products in a shelf of said shelves and in said shelves.

7. The method according to claim 1, wherein the method further comprises a step of extracting analytic and statistical data from the category analysis that construct a map, wherein the map comprises:
a) a traffic distribution map that shows penetration of said plurality of persons throughout the category,
b) a shopping distribution map that shows the activity of said plurality of persons throughout the category,
c) a shopping conversion map that shows traffic of said plurality of persons converted to shopping activity,
d) a sub-category level traffic distribution map,
e) a sub-category level shopping distribution map, and
f) a sub-category level shopping conversion map,
whereby the map uses color-coded symbolic expressions to differentiate the information on the map among said plurality of persons at the category.

8. The method according to claim 1, wherein the method further comprises a step of calculating quantitative measurement per sub-category,
whereby the quantitative measurement comprises a ratio between shopping interaction levels per sub-category, based on actual measurement for the shopping interaction levels of said plurality of persons.

9. The method according to claim 1, wherein the method further comprises a step of measuring dominant path at a location in said category,
whereby the dominant path measurement shows a specific decision pattern and the tendency of decision for the next path by said plurality of persons, and
whereby next region for the path direction is defined either point-level or polygon-level depending on the pre-defined granularity of the next region in said category.

10. The method according to claim 1, wherein the method further comprises a step of extracting analytic and statistical data from the category analysis that construct a shopping correlation analysis that is defined as the optimal distance measure among a plurality of sub-categories shopped.

11. The method according to claim 1, wherein the method further comprises a step of extracting analytic and statistical data from the category analysis that construct a shopping sequence analysis that is the order of a plurality of sub-categories shopped,
whereby the sequence analysis shows the order of shopping engagement by said plurality of persons.

12. The method according to claim 1, wherein the method further comprises a step of applying a set of predefined rules in a rule-base to the category analysis, comprising steps of:
a) augmenting the information units from said video-based behavior analysis for said plurality of persons, and
b) utilizing a polymorphic operator for applying said set of predefined rules to the information units.

13. The method according to claim 1, wherein the method further comprises a step of
dividing the region of interest in said category into logical grid elements by taking the perspective distortion into account through a grid generation module,
whereby said region of interest in said category comprises sub-regions on a shelf that make up a product group.

14. The method according to claim 1, wherein the method further comprises a step of matching all the grid elements that match each product group by checking for intersection of the grid element with the regions through a grid assignment module.

15. The method according to claim 1, wherein the method further comprises a step of
detecting temporal motion at every pixel in the image,
wherein the grid elements that have a minimum threshold of pixel with motion are marked as active grid elements, and
whereby a look up logic module is used to determine which region is being interacted with to find the right product group.

16. The method according to claim 1, wherein the method further comprises a step of measuring dwell time of said plurality of persons in said category.

17. The method according to claim 1, wherein the method further comprises a step of utilizing second means for capturing images to track the hand of each person in said plurality of persons in said category,
whereby the hand tracking provides sub-category level information for shopping interaction of said plurality of persons in said category.

18. The method according to claim 1, wherein the method further comprises a step of analyzing the syndicated data per category level as opposed to product level.

19. The method according to claim 1, wherein the method further comprises a step of analyzing said category in regards to the segmentation of said plurality of persons,
whereby said segmentation comprises demographic classification or shopping pattern of said plurality of persons.

20. The method according to claim 1, wherein the method further comprises a step of defining and utilizing shopping interaction levels for analyzing the behavior category of said plurality of persons in said category.

21. The method according to claim 1, wherein the method further comprises a step of analyzing the stopping power based on dwell time of said plurality of persons in said category,
whereby the stopping power comprises any logical and physical cause that stops said plurality of persons nearby a physical location in a category.

22. The method according to claim 1, wherein the method further comprises a step of utilizing prior knowledge about the physical location of said category in said physical space as an attribute for the category analysis.

23. The method according to claim 1, wherein the method further comprises a step of forming a string of behavior measurement for said plurality of persons during a window of time,
whereby each element in the string of behavior measurement consists of sub-category number, interaction level, and information with regard to the sub-category.

24. The method according to claim 1, wherein the method further comprises a step of building a model for product group interaction detection.

25. An apparatus for automatically analyzing a category in a physical space based on video-based behavior analysis of a plurality of persons with regard to said category in the physical space, comprising:
a) a plurality of means for capturing images that capture a plurality of input images of said plurality of persons,
wherein the plurality of means for capturing images are located in the area with regard to said category, and
wherein the means for capturing images includes at least a camera,
b) at least a computer that executes computer vision algorithms for said plurality of input images,
wherein the computer vision algorithms include algorithms for person tracking, hand motion detection, and demographic classification, and
wherein the computer performs the following steps of:
processing said plurality of input images in order to process a video-based behavior analysis of each person in said plurality of persons, analyzing the category based on the accumulation of said video-based behavior analysis for said plurality of persons, and measuring the effect after making a change at the category level, whereby the analysis of said category facilitates an analysis of level of engagement and decision process at the category level, and whereby said change comprises change in the quantity, price, and position of certain products in said category.

26. The apparatus according to claim 25, wherein the apparatus further comprises a computer for measuring domain specific information in said category, whereby said domain specific information comprises sequence of products shopped in said category, ranking of products shopped in said category, product purchase pattern, and comparison of products interacted by said plurality of persons within said category.

27. The apparatus according to claim 25, wherein the apparatus further comprises a computer for analyzing the shopping pattern of said plurality of persons when a shelf space in said shelves that are located in regards to said category is empty.

28. The apparatus according to claim 25, wherein the apparatus further comprises a computer for calculating the frequency of replenishing a certain product in shelves that are located in regards to said category, whereby the calculation increases the efficiency in inventory management of the product.

29. The apparatus according to claim 25, wherein the apparatus further comprises a computer for calculating optimal size and height of shelves that are located in regards to said category based on shopping interaction analysis in regards to said shelves.

30. The apparatus according to claim 25, wherein the apparatus further comprises a computer for calculating optimal layout for shelves that are located in regards to said category, whereby said optimal layout provides information for optimal position of a product, optimal number of products, efficient product assortment, and optimal type of products in a shelf of said shelves and in said shelves.

31. The apparatus according to claim 25, wherein the apparatus further comprises a computer for extracting analytic and statistical data from the category analysis that construct a map, wherein the map comprises:
a) a traffic distribution map that shows penetration of said plurality of persons throughout the category,
b) a shopping distribution map that shows the activity of said plurality of persons throughout the category,
c) a shopping conversion map that shows traffic of said plurality of persons converted to shopping activity,
d) a sub-category level traffic distribution map,
e) a sub-category level shopping distribution map, and
f) a sub-category level shopping conversion map,
whereby the map uses color-coded symbolic expressions to differentiate the information on the map among said plurality of persons at the category.

32. The apparatus according to claim 25, wherein the apparatus further comprises a computer for calculating quantitative measurement per sub-category, whereby the quantitative measurement comprises a ratio between shopping interaction levels per sub-category, based on actual measurement for the shopping interaction levels of said plurality of persons.

33. The apparatus according to claim 25, wherein the apparatus further comprises a computer for measuring dominant path at a location in said category, whereby the dominant path measurement shows a specific decision pattern and the tendency of decision for the next path by said plurality of persons, and whereby next region for the path direction is defined either point-level or polygon-level depending on the pre-defined granularity of the next region in said category.

34. The apparatus according to claim 25, wherein the apparatus further comprises a computer for extracting analytic and statistical data from the category analysis that construct a shopping correlation analysis that is defined as the optimal distance measure among a plurality of sub-categories shopped.

35. The apparatus according to claim 25, wherein the apparatus further comprises a computer for extracting analytic and statistical data from the category analysis that construct a shopping sequence analysis that is the order of a plurality of sub-categories shopped, whereby the sequence analysis shows the order of shopping engagement by said plurality of persons.

36. The apparatus according to claim 25, wherein the apparatus further comprises a computer for applying a set of predefined rules in a rule-base to the category analysis, wherein the computer performs the following steps of:
a) augmenting the information units from said video-based behavior analysis for said plurality of persons, and
b) utilizing a polymorphic operator for applying said set of predefined rules to the information units.

37. The apparatus according to claim 25, wherein the apparatus further comprises a computer for dividing the region of interest in said category into logical grid elements by taking the perspective distortion into account through a grid generation module, whereby said region of interest in said category comprises sub-regions on a shelf that make up a product group.

38. The apparatus according to claim 25, wherein the apparatus further comprises a computer for matching all the grid elements that match each product group by checking for intersection of the grid element with the regions through a grid assignment module.

39. The apparatus according to claim 25, wherein the apparatus further comprises a computer for detecting temporal motion at every pixel in the image, wherein the grid elements that have a minimum threshold of pixel with motion are marked as active grid elements, and whereby a look up logic module is used to determine which region is being interacted with to find the right product group.

40. The apparatus according to claim 25, wherein the apparatus further comprises a computer for measuring dwell time of said plurality of persons in said category.

41. The apparatus according to claim 25, wherein the apparatus further comprises a computer for utilizing second means for capturing images to track the hand of each person in said plurality of persons in said category, whereby the hand tracking provides sub-category level information for shopping interaction of said plurality of persons in said category.

42. The apparatus according to claim 25, wherein the apparatus further comprises a computer for analyzing the syndicated data per category level as opposed to product level.

43. The apparatus according to claim 25, wherein the apparatus further comprises a computer for analyzing said category in regards to the segmentation of said plurality of persons, whereby said segmentation comprises demographic classification or shopping pattern of said plurality of persons.

44. The apparatus according to claim 25, wherein the apparatus further comprises a computer for defining and utilizing shopping interaction levels for analyzing the behavior category of said plurality of persons in said category.

45. The apparatus according to claim 25, wherein the apparatus further comprises a computer for analyzing the stopping power based on dwell time of said plurality of persons in said category,
   whereby the stopping power comprises any logical and physical cause that stops said plurality of persons nearby a physical location in a category.

46. The apparatus according to claim 25, wherein the apparatus further comprises a computer for utilizing prior knowledge about the physical location of said category in said physical space as an attribute for the category analysis.

47. The apparatus according to claim 25, wherein the apparatus further comprises a computer for forming a string of behavior measurement for said plurality of persons during a window of time,
   whereby each element in the string of behavior measurement consists of sub-category number, interaction level, and information with regard to the sub-category.

48. The apparatus according to claim 25, wherein the apparatus further comprises a computer for building a model for product group interaction detection.

\* \* \* \* \*